(12) United States Patent
Ohno et al.

(10) Patent No.: US 10,005,417 B2
(45) Date of Patent: Jun. 26, 2018

(54) OCCUPANT PROTECTION DEVICE

(71) Applicant: TOYOTA JIDOSHA KABUSHIKI KAISHA, Toyota-shi, Aichi-ken (JP)

(72) Inventors: Mitsuyoshi Ohno, Miyoshi (JP); Yasushi Masuda, Kiyosu (JP); Shigeyuki Suzuki, Kiyosu (JP); Hiroshi Kato, Kiyosu (JP); Shinichi Ishida, Kiyosu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days. days.

(21) Appl. No.: 15/211,464

(22) Filed: Jul. 15, 2016

(65) Prior Publication Data
US 2017/0028955 A1 Feb. 2, 2017

(30) Foreign Application Priority Data

Jul. 28, 2015 (JP) ................. 2015-148994

(51) Int. Cl.
*B60R 21/207* (2006.01)
*B60R 21/233* (2006.01)
(Continued)

(52) U.S. Cl.
CPC .......... *B60R 21/207* (2013.01); *B60R 21/233* (2013.01); *B60R 21/2334* (2013.01);
(Continued)

(58) Field of Classification Search
CPC . B60R 21/207; B60R 21/2334; B60R 21/233; B60R 21/231; B60R 2021/2074;
(Continued)

(56) References Cited

U.S. PATENT DOCUMENTS 9,573,553 B2 * 2/2017 Ko .......... B60R 21/233
2012/0049493 A1 3/2012 Lee
(Continued)

FOREIGN PATENT DOCUMENTS

CN 104228746 A 12/2014
DE 92 02 725 U1 8/1992
(Continued)

OTHER PUBLICATIONS

U.S. Appl. No. 15/562,200, filed Sep. 27, 2017 in the name of Ohno et al.

(Continued)

*Primary Examiner* — Keith Frisby
(74) *Attorney, Agent, or Firm* — Oliff PLC

(57) ABSTRACT

An occupant protection device configured as an integral bag body including an airbag, the airbag including: a frame duct that includes an upper duct inflated and deployed at a seat upper side of the head of an occupant with a seat front end of the upper duct reaching a seat front side of the head of the occupant in an inflated and deployed state; a front inflating portion that receives gas supplied from a portion of the frame duct that has reached in front of the head, and is that inflated and deployed at the seat front side of the head of the occupant; and a pair of lateral inflating portions that receive gas supplied from the frame duct or the front inflating portion, or both, and that are inflated and deployed at both seat width direction sides of the head of the occupant.

12 Claims, 11 Drawing Sheets

(51) Int. Cl.
*B60R 21/2334* (2011.01)
*B60R 21/00* (2006.01)
*B60R 21/16* (2006.01)

(52) U.S. Cl.
CPC . *B60R 2021/0048* (2013.01); *B60R 2021/161* (2013.01); *B60R 2021/2074* (2013.01); *B60R 2021/23308* (2013.01)

(58) Field of Classification Search
CPC .......... B60R 2021/23308; B60R 2021/23316; B60R 2021/23324; B60R 2021/0048; B60R 2021/161; B60R 2021/23107
USPC ....... 280/729, 730.1, 743.1; 297/216.12, 391
See application file for complete search history.

(56) References Cited

U.S. PATENT DOCUMENTS

| 2013/0015642 | A1* | 1/2013 | Islam | B60R 21/207 |
| | | | | 280/730.1 |
| 2014/0327234 | A1* | 11/2014 | Heurlin | B60R 21/207 |
| | | | | 280/730.1 |
| 2015/0091278 | A1 | 4/2015 | Yasuoka | |
| 2016/0347272 | A1 | 12/2016 | Kato et al. | |

FOREIGN PATENT DOCUMENTS

| DE | 198 34 061 A1 | 2/2000 |
| DE | 19859988 B4 | 6/2010 |
| FR | 2 133 239 A5 | 11/1972 |
| GB | 1 301 867 A | 1/1973 |
| JP | H10-244894 A | 9/1998 |
| JP | 2000-094999 A | 4/2000 |
| JP | 2000-344044 A | 12/2000 |
| JP | 2005-088675 A | 4/2005 |
| JP | 2007-230395 A | 9/2007 |
| JP | 2008-207661 A | 9/2008 |
| JP | 2010-126141 A | 6/2010 |
| JP | 2012-051541 A | 3/2012 |
| JP | 2013-018378 A | 1/2013 |
| JP | 2015-013553 A | 1/2015 |
| JP | 2015-071317 A | 4/2015 |
| JP | 2016-222072 A | 12/2016 |
| WO | 2003/043859 A1 | 5/2003 |

OTHER PUBLICATIONS

Jan. 23, 2018 Office Action issued in Japanese Patent Application No. 2015-148994.
Mar. 27, 2018 Search Report issued in European Patent Application No. 15890768.3.

* cited by examiner

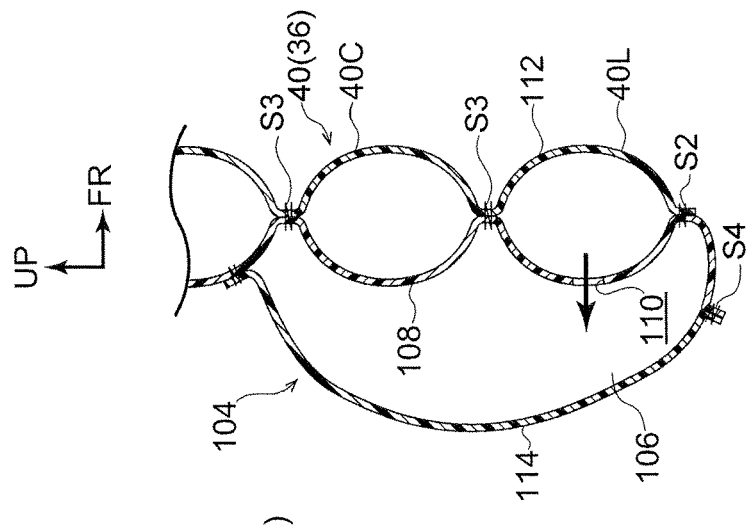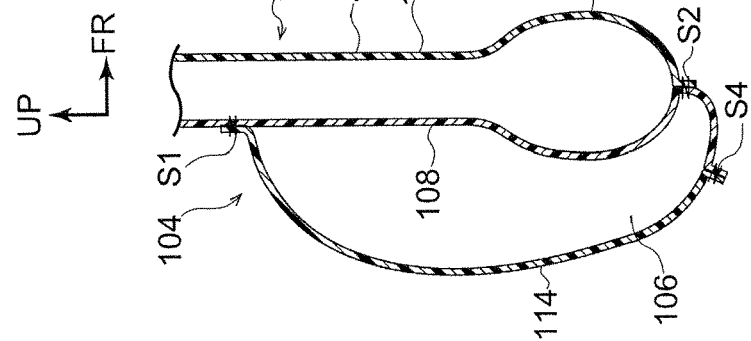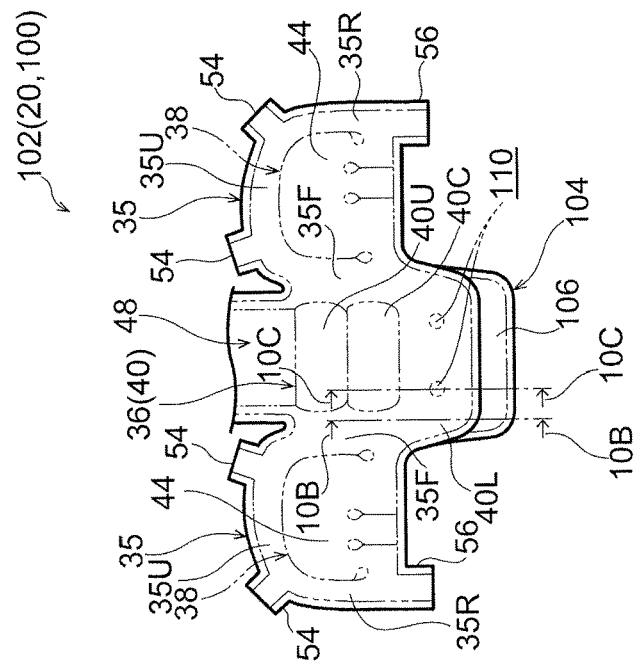

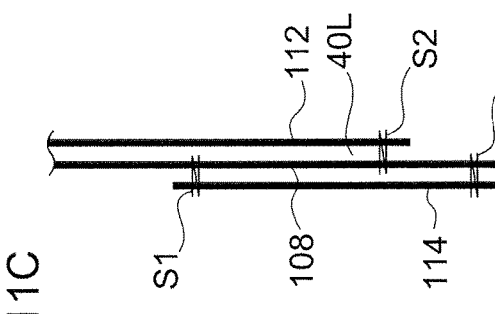
FIG.11A
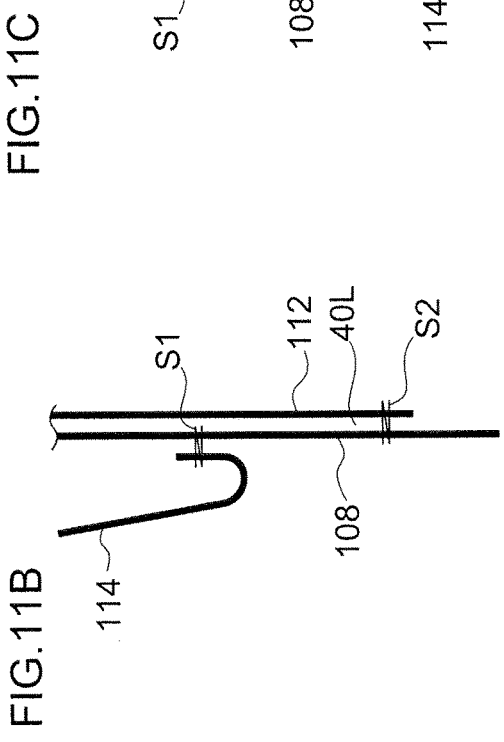
FIG.11B
FIG.11C
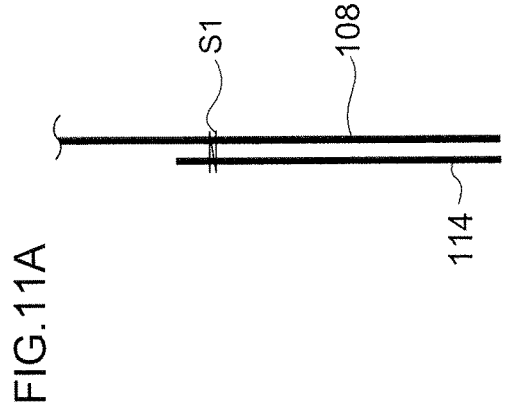
FIG.11D
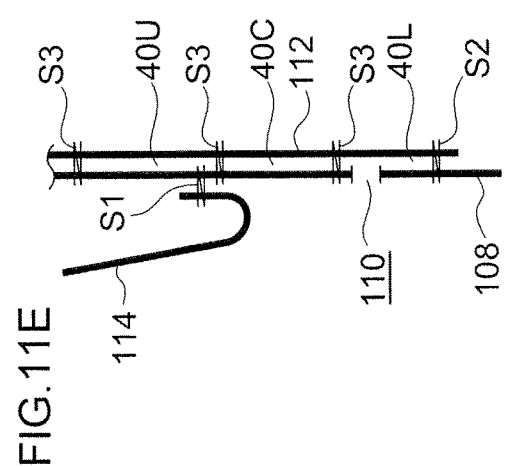
FIG.11E
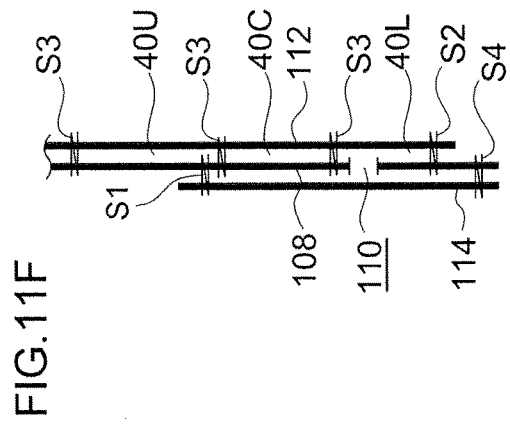
FIG.11F

OCCUPANT PROTECTION DEVICE

CROSS-REFERENCE TO RELATED APPLICATION

This application is based on and claims priority under 35 USC 119 from Japanese Patent Application No. 2015-148994 filed on Jul. 28, 2015, the disclosure of which is incorporated by reference herein.

BACKGROUND

Technical Field

The present invention relates to an occupant protection device.

Related Art

Airbag devices are known in which gas from an inflator is supplied through a gas supply pipe fixed to a seatback to a bag attached to the gas supply pipe, and the bag is inflated so as to surround an occupant from the front and the side in a collision (see Japanese Patent Application Laid-Open (JP-A) No. 2000-344044). Airbag devices are also known in which head airbags protrude out from left and right end portions of a seat headrest toward the front, and join up in front of the head of an occupant, and an auxiliary head airbag protrudes out toward the front from a central portion of the headrest and joins up with the pair of head airbags (see JP-A No. 2013-018378).

In the configuration of JP-A No. 2000-344044, the gas supply pipe is provided projecting out above the seatback, and so the appearance is negatively affected and the gas supply pipe becomes an interference when the vehicle seat is operated. These issues are resolved by a configuration in which the head airbags are housed inside the headrest, as described in JP-A No. 2013-018378. In the configuration of JP-A No. 2013-018378, it is difficult to secure joint strength between the pair of head airbags that are joined together after inflation and deployment, and joint strength of the auxiliary head airbag with respect to the pair of head airbags.

As a countermeasure thereto, it would be conceivable to adopt a configuration in which an airbag, configured as an integral bag body and housed inside the headrest or the seatback, is inflated and deployed so as to surround the head of an occupant from the seat front side and both seat width direction sides. In such a configuration, part of the airbag is inflated and deployed passing over the head of the occupant, and so there is room for improvement from the perspective of inflating and deploying a front inflating portion at the seat front side of the head of the occupant. Specifically, deployment performance of the airbag to inflate and deploy the front inflating portion in front of the head of the occupant, and restraint performance of the head of the occupant by the front inflating portion, are both required.

SUMMARY

In a configuration in which an airbag configured as an integral bag body is housed in a headrest or a seatback, an object of the present invention is to obtain an occupant protection device that is capable of achieving both deployment performance of the airbag to inflate and deploy a front inflating portion in front of the head of an occupant, and restraint performance of the head of the occupant by the airbag.

An occupant protection device according to a first aspect of the present invention is configured as an integral bag body, including an airbag that, from a state housed in a headrest or a seatback, is inflated and deployed on being supplied with gas, the airbag including: a frame duct that, as viewed from a seat width direction, includes an upper duct inflated and deployed at a seat upper side of the head of an occupant with a seat front end of the upper duct reaching a seat front side of the head of the occupant in an inflated and deployed state; a front inflating portion that receives gas supplied from a portion of the frame duct that has reached in front of the head, and is that inflated and deployed at the seat front side of the head of the occupant; and a pair of lateral inflating portions that receive gas supplied from the frame duct or the front inflating portion, or both, and that are inflated and deployed at both seat width direction sides of the head of the occupant.

In this occupant protection device, when gas is supplied to the frame duct of the airbag during a vehicle collision, for example, the upper duct of the frame duct is inflated and deployed toward the front above the head of the occupant as viewed from the side, and the seat front end of the upper duct passes above the head of the occupant in this process. The front inflating portion is inflated and deployed at the seat front side of the head of the occupant on receiving gas supplied from the frame duct. The pair of lateral inflating portions receive gas supplied from the frame duct or the front inflating portion and are inflated and deployed on either side of the head of the occupant so as to sandwich the head in the seat width direction. Thus, the head of the occupant is surrounded from the seat front side and both sides (three sides) by the front inflating portion and the pair of lateral inflating portions.

Note that the upper duct, the front end of which reaches the seat front side of the head of the occupant as viewed from the seat width direction, is inflated and deployed in advance of the front inflating portion. After the seat front end of the upper duct has passed beyond the head of the occupant in the inflation and deployment process of the airbag, gas supplied from a portion of the frame duct, which includes the upper duct, that has reached in front of the head of the occupant, is received by the front inflating portion, which is inflated and deployed at the seat front side of the head. This enables the front inflating portion to be inflated and deployed at the seat front side of the head of the occupant with a high degree of certainty. This enables the front inflating portion to be inflated and deployed closer to the head of the occupant than in configurations which do not include the frame duct that contributes to deployment performance in this manner.

Thus, the configuration of the first aspect of the present invention, with the configuration in which the airbag, configured as an integral bag body, is housed inside the headrest or the seatback, enables both deployment performance of the airbag to inflate and deploy the front inflating portion in front of the head of the occupant, and restraint performance of the head of the occupant by the airbag, to be achieved.

An occupant protection device according to a second aspect of the present invention has the configuration of the first aspect, further including a delayed inflating portion that receives gas supplied from the front inflating portion in a state of being inflated and deployed at the seat front side of the head or a portion of the frame duct inflated and deployed in front of the head, or both, and is inflated and deployed after inflation and deployment of the front inflating portion.

In this occupant protection device, when the front inflating portion is inflated and deployed at the seat front side of the head of the occupant, the delayed inflating portion is supplied with gas from the front inflating portion or the frame duct, and the delayed inflating portion is inflated and deployed at the seat rear side of the front inflating portion.

There is almost no inflation of the delayed inflating portion during the inflation and deployment process of the front inflating portion, such that the front inflating portion is inflated and deployed at the seat front side of the head of the occupant with a separation therebetween, compared to airbags in which a portion corresponding to the delayed inflating portion and a portion corresponding to the front inflating portion are inflated and deployed at the same time. The delayed inflating portion is then supplied with gas from the front inflating portion or the frame duct, enabling the inflating portions of the airbag to be inflated and deployed closer to the head of the occupant than in airbags in which the delayed inflating portion is not included.

Thus, in the configuration of the second aspect of the present invention, the front inflating portion can be inflated and deployed even closer to the head of the occupant while securing deployment performance of the airbag, such that restraint performance of the head of the occupant by the airbag is improved. Namely, the occupant protection device enables both deployment performance of the airbag and restraint performance of the head by the airbag to be achieved to a higher degree.

An occupant protection device according to a third aspect of the present invention has the configuration of the second aspect, wherein the delayed inflating portion is configured including a pair of up-down inflating portions that each have a length direction along an up-down direction and are inflated and deployed adjacent to each other in the seat width direction.

In this occupant protection device, the pair of up-down inflating portions are inflated and deployed in front of the head of the occupant. When the head of the occupant moves toward the front accompanying a collision at a seat front side section of the vehicle, for example, the head is restrained from both left and right sides by the up-down inflating portions. This enables the posture of the head of the occupant to be more easily stabilized when being restrained than in comparative modes in which a single inflating portion contacts the head of the occupant.

An occupant protection device according to a fourth aspect of the present invention has the configuration of the second aspect, wherein the front inflating portion is configured including plural width direction inflating portions that are inflated and deployed alongside each other in an up-down direction with a length direction along the seat width direction; and the delayed inflating portion is configured including plural up-down inflating portions that each have a length direction along the up-down direction and are inflated and deployed alongside each other in the seat width direction and intersecting the width direction inflating portions as viewed from a seat rear side.

In this occupant protection device, the plural up-down inflating portions configuring the delayed inflating portion are inflated and deployed intersecting the plural width direction inflating portions configuring the front inflating portion as viewed from the seat rear side (the occupant side). Thus, the up-down inflating portions that bear load from the head of the occupant are firmly supported by the plural width direction inflating portions. Thus, the present occupant protection device enables the head of the occupant to be effectively restrained using a smaller capacity than in comparative modes in which the front inflating portion is configured by a single inflating portion or plural up-down inflating portions. In particular, setting a configuration in which the plural up-down inflating portions are a pair of up-down inflating portions inflated and deployed adjacent to each other in the seat width direction enables the head of the occupant to be restrained in a posture stabilized from both left and right sides.

An occupant protection device according to a fifth aspect of the present invention has the configuration of the second aspect, wherein the front inflating portion is configured including plural up-down inflating portions that each have a length direction along an up-down direction and are inflated and deployed alongside each other in the seat width direction, and the delayed inflating portion is configured including width direction inflating portions that each have a length direction along the seat width direction and are arrayed in the up-down direction, the width direction inflating portions being inflated and deployed intersecting the up-down inflating portions as viewed from a seat rear side.

In this occupant protection device, the plural width direction inflating portions configuring the delayed inflating portion are inflated and deployed intersecting the plural up-down inflating portions configuring the front inflating portion as viewed from the seat rear side (the occupant side). Thus, the width direction inflating portions that bear load from the head of the occupant are firmly supported by the up-down inflating portions. Thus, the present occupant protection device enables the head of the occupant to be effectively restrained using a smaller capacity than in comparative modes in which the front inflating portion is configured by a single inflating portion or plural width direction inflating portions.

An occupant protection device according to a sixth aspect of the present invention has the configuration of any one of the second aspect to the fifth aspect, further including a seatbelt device that restrains the waist of the occupant using a lap belt, wherein the delayed inflating portion is configured so as to be supplied with gas from a gas supply section disposed at a lower portion of the front inflating portion in an inflated and deployed state.

In this occupant protection device, during a collision at a seat front side section of the vehicle, for example, the upper body of the occupant who is being restrained by the lap belt tilts forward, and their head moves forward and downward. The delayed inflating portion is supplied with gas from the lower portion of the inflated and deployed front inflating portion, and is inflated and deployed from a lower portion toward an upper portion, enabling the head of the occupant moving forward and downward as described above to be effectively restrained.

An occupant protection device according to a seventh aspect of the present invention has the configuration of the sixth aspect, wherein the front inflating portion is configured including a lower inflating portion that is inflated and deployed in front of at least one out of the shoulders or chest of the occupant, and the gas supply section is disposed at a lower portion of the lower inflating portion in an inflated and deployed state.

In this occupant protection device, the delayed inflating portion is supplied with gas from the lower inflating portion of the front inflating portion. This enables the lower inflating portion to be inflated and deployed prior to inflation and deployment of the delayed inflating portion, enabling at least one out of the shoulders or chest of the occupant to be restrained by the lower inflating portion at an early stage.

An occupant protection device according to an eighth aspect of the present invention has the configuration of any one of the second aspect to the seventh aspect, wherein the front inflating portion is configured including a lower inflating portion that is inflated and deployed in front of at least one out of the shoulders or chest of the occupant, and the delayed inflating portion is configured including an upper body restraint portion that is inflated and deployed toward the shoulders and chest of the occupant from a side of the lower inflating portion present in an inflated and deployed state.

In this occupant protection device, the upper body restraint portion of the delayed inflating portion receives gas supplied from the lower inflating portion of the front inflating portion and is inflated and deployed toward the shoulders and chest of the occupant. This enables a front portion of the airbag to be inflated and deployed closer to the shoulders and chest of the occupant than in airbags that do not include the upper body restraint portion.

An occupant protection device according to a ninth aspect of the present invention has the configuration of any one of the second aspect to the eighth aspect, wherein the delayed inflating portion is configured so as to be supplied with gas from the front inflating portion through a communicating hole formed piercing through a base cloth at a portion dividing between the front inflating portion and the delayed inflating portion.

In this occupant protection device, the delayed inflating portion is supplied with gas from the front inflating portion through the communicating hole formed piercing through the base cloth. This configuration enables the flow rate of gas supplied from the front inflating portion to the delayed inflating portion (the deployment completion timing of the delayed inflating portion) to be adjusted according to the opening area (diameter) of the communicating hole. Thus, the present configuration enables the flow rate of gas supplied from the front inflating portion to the delayed inflating portion to be adjusted using a simpler configuration than in comparative modes in which a gas supply section that supplies gas from the front inflating portion to the delayed inflating portion has a duct-shaped three dimensional structure.

An occupant protection device according to a tenth aspect of the present invention has the configuration of any one of the first aspect to the ninth aspect, further including a pair of the frame ducts that are provided separated from each other in the seat width direction in an inflated and deployed state, and a cross inflating portion that couples together the upper ducts of the pair of frame ducts and that is inflated and deployed on receiving gas supplied from the upper duct of the frame duct.

In this occupant protection device, since the cross inflating portion couples (connects in a communicating state) the pair of upper ducts together in the inflated and deployed state of the airbag, in other words, since a continuous, integral inflating portion is configured by the pair of upper ducts together with the cross inflating portion, the airbag that is an integral bag body is more easily stably inflated and deployed.

An occupant protection device according to an eleventh aspect of the present invention has the configuration of the tenth aspect, wherein the pair of frame ducts each include a front duct that is inflated and deployed downward from the seat front end of the upper duct, the front inflating portion is, in an inflated and deployed state, connected to the respective front ducts of the pair of frame ducts, and the pair of lateral inflating portions are, in an inflated and deployed state, connected to the upper ducts and the front ducts of the frame ducts.

In this occupant protection device, gas flows via the upper ducts into the front ducts of the pair of frame ducts, and the front ducts are inflated and deployed downward from leading ends of the upper ducts. The front inflating portion is connected to the pair of front ducts and is thereby inflated after being deployed up and down accompanying inflation and deployment of the front ducts, and so is less liable to impinge on the head of the occupant in the inflation and deployment process. The lateral inflating portions are respectively connected to the front ducts and the upper ducts of the frame ducts and are thereby inflated after being deployed accompanying inflation and deployment of the front ducts, and so are less liable to impinge on the head of the occupant in the inflation and deployment process.

As explained above, in configurations in which the airbag configured as an integral bag body is housed in the headrest or the seatback, the occupant protection device according to the present invention exhibits an excellent advantageous effect enabling both deployment performance of the airbag to inflate and deploy the front inflating portion in front of the head of an occupant, and restraint performance of the head of the occupant by the airbag, to be achieved.

BRIEF DESCRIPTION OF THE DRAWINGS

Exemplary embodiments of the present invention will be described in detail based on the following figures, wherein:

FIG. 10A is a diagram illustrating part of a flat pattern of a multidirectional airbag configuring an occupant protection device according to a fourth exemplary embodiment of the present invention;

FIG. 10B is an enlarged cross-section along line 10B-10B in FIG. 10A, illustrating an inflated and deployed state of part of a multidirectional airbag configuring an occupant protection device according to the fourth exemplary embodiment of the present invention;

FIG. 10C is an enlarged cross-section along line 10C-10C in FIG. 10A, illustrating an inflated and deployed state of a part of a multidirectional airbag configuring an occupant protection device according to the fourth exemplary embodiment of the present invention;

FIGS. 11A to 11C are cross-sections schematically illustrating a manufacturing process of a part taken along line 10B-10B in FIG. 10A, illustrating a manufacturing process of multidirectional airbag configuring an occupant protection device according to the fourth exemplary embodiment of the present invention; and FIGS. 11D to 11F are cross-sections schematically illustrating a manufacturing process of a part taken along line 10C-10C in FIG. 10A, illustrating a manufacturing process of multidirectional airbag configuring an occupant protection device according to the fourth exemplary embodiment of the present invention.

DETAILED DESCRIPTION

First Exemplary Embodiment

Figure 1:
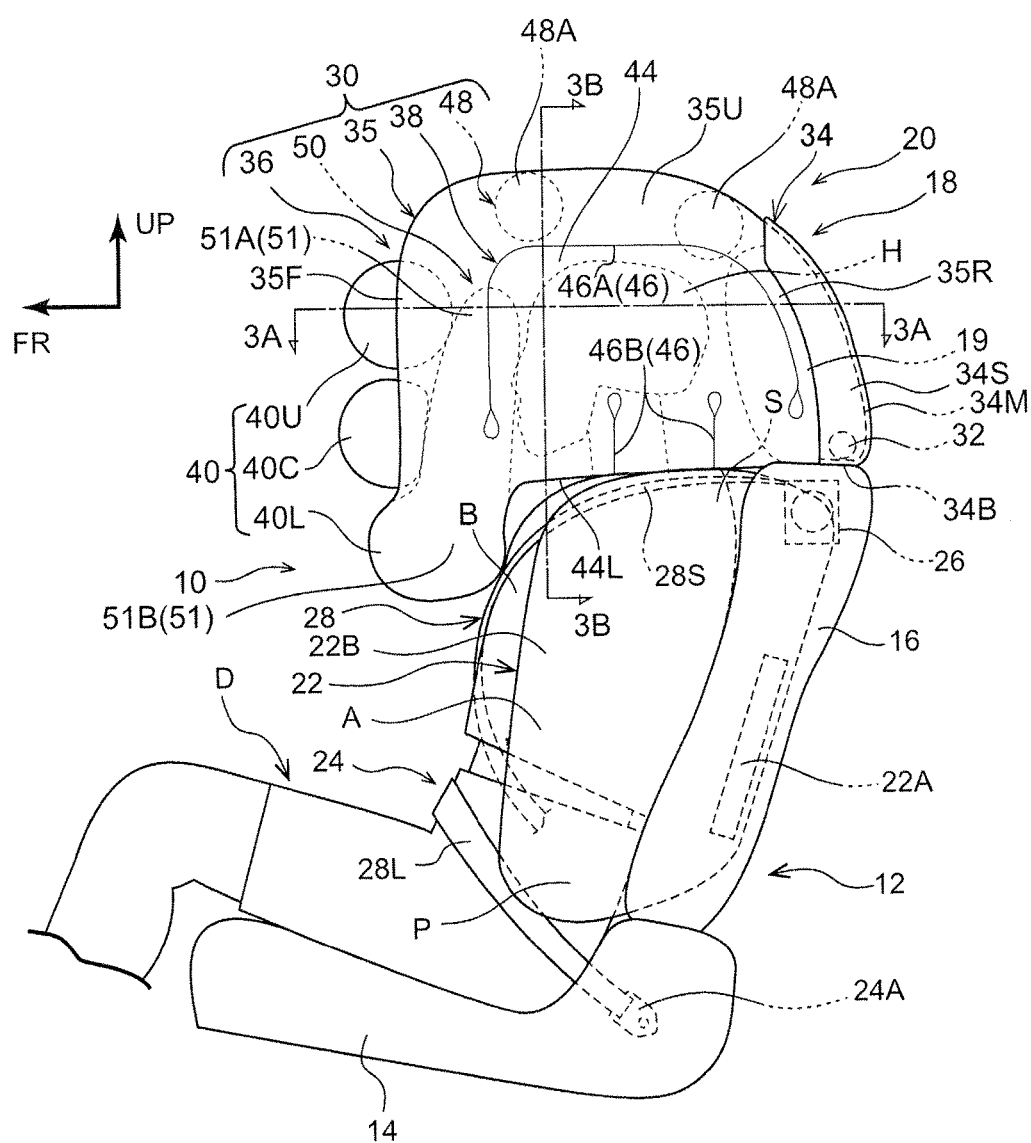
FIG. 1 is a side view schematically illustrating an actuated state of an occupant protection device according to a first exemplary embodiment of the present invention.

Explanation follows regarding an occupant protection device 10 according to a first exemplary embodiment of the present invention, with reference to FIGS. 1 to 6. Note that in the drawings, the arrow FR and the arrow UP respectively indicate a front direction (the direction in which a seated occupant faces) and an upper direction of a vehicle seat 12 as appropriate. In the following explanation, unless specifically indicated, reference simply to the front and rear, up and down, and left and right directions indicates the front and rear in a seat front-rear direction, up and down in a seat up-down direction, and left and right when facing forward in the seat front-rear direction. Note that in the vehicle seat 12 of the present exemplary embodiment, the seat front-rear direction matches the front-rear direction of the vehicle, the seat up-down direction matches the up-down direction of the vehicle, and the seat width direction matches the vehicle width direction. In the drawings, the arrow IN indicates the vehicle central side in the vehicle width direction as appropriate, in an automobile serving as the vehicle installed with the vehicle seat 12.

Schematic Overall Configuration of Occupant Protection Device

As illustrated in FIGS. 1, 2, 4A and 4B, the occupant protection device 10 is installed to the vehicle seat 12. The vehicle seat 12 is disposed offset to either the left or the right with respect to a vehicle width direction center of a vehicle body of the automobile, not illustrated in the drawings (on the left side in the present exemplary embodiment). The vehicle seat 12 is configured including a seat cushion 14, a seatback 16 of which a lower end is coupled to a rear end of the seat cushion 14, and a headrest 18 provided at an upper end of the seatback 16.

Figure 5:
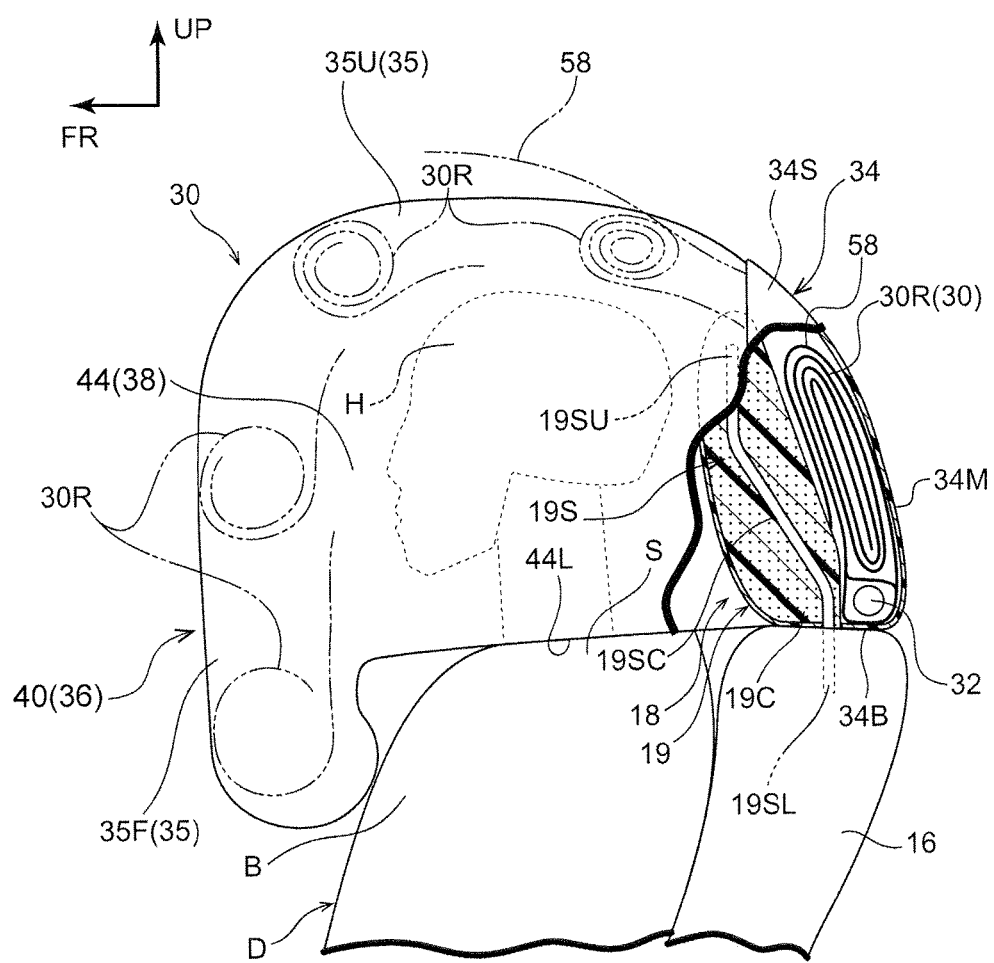
FIG. 5 is an enlarged, partially cutout schematic side view for explaining an inflation and deployment process of a multidirectional airbag configuring an occupant protection device according to the first exemplary embodiment of the present invention.

As illustrated in FIG. 5, the headrest 18 is configured including a headrest main body 19 that is attached to the seatback 16, and a module case 34 (described later), functioning as a back board configuring a rear design portion of the headrest 18. The headrest main body 19 is attached to the seatback 16 through headrest stays 19S. Each headrest stay 19S is configured such that an upper portion 19SU is positioned in front of a lower portion 19SL that is supported by the seatback 16, and the lower portion 19SL and the upper portion 19SU are coupled together by a sloped intermediate portion 19SC.

FIGS. 1, 2, 4A, 4B, and so on illustrate a crash test dummy (doll) D, serving as a model of an occupant to be protected, in a seated state on the seat cushion 14 of the vehicle seat 12. The dummy D is, for example, a World Side Impact Dummy (World SID) of a 50th percentile American adult male (AM50). The dummy D is seated in a standard seated posture specified in crash testing methods, and the vehicle seat 12 is positioned in a reference setting position corresponding to the seated posture. In the interest of simplicity of explanation, the dummy D is hereafter referred to as the "seated occupant D".

The occupant protection device 10 is configured including a multidirectional airbag device 20 for protecting the seated occupant D in various collision modes, a side airbag device 22, and a seatbelt device 24. Schematic configurations of the seatbelt device 24 and the side airbag device 22 are described below, following which detailed explanation is given regarding configuration of the multidirectional airbag device 20.

The seatbelt device 24 is a three-point type seatbelt device, in which a belt (webbing) 28 is taken up on a retractor 26 from one end so as to be capable of being pulled out, and the other end of the belt 28 is fixed to an anchor 24A. The belt 28 is provided with a slidable tongue plate 24T, and the belt 28 is worn by the seated occupant D by anchoring the tongue plate 24T to a buckle 24B. Configuration is such that, in a state in which the belt 28 is being worn by the seated occupant D, a shoulder belt 28S of the belt 28 spanning from the retractor 26 to the tongue plate 24T is worn over the upper body of the seated occupant D, and a lap belt 28L of the belt 28 spanning from the tongue plate 24T to the anchor 24A is worn over the waist P of the seated occupant D.

In the present exemplary embodiment, the seatbelt device 24 is configured as what is referred to as a seat-attached seatbelt device in which the retractor 26, the anchor 24A, and the buckle 24B are provided to the vehicle seat 12. Moreover, in the present exemplary embodiment, the retractor 26 includes a pre-tensioner function that forcibly takes up the belt 28 when actuated. The pre-tensioner function of the retractor 26 is actuated by an ECU 60, described later.

The side airbag device 22 is configured including an inflator 22A and a side airbag 22B. The side airbag device 22 is housed in a side section on the vehicle width direction outside of the seatback 16, with the side airbag 22B in a folded state. On actuation, the inflator 22A generates gas inside the side airbag 22B. Configuration is such that this gas causes the side airbag 22B to protrude out from the side section of the seatback 16 toward the front, and inflate and deploy to the vehicle width direction outside of the seated occupant D. In the present exemplary embodiment, the side airbag 22B is configured to inflate and deploy at the vehicle width direction outside of the waist P, abdomen A, chest B, and shoulders S of the seated occupant D.

Multidirectional Airbag Device Configuration

Figure 4A:
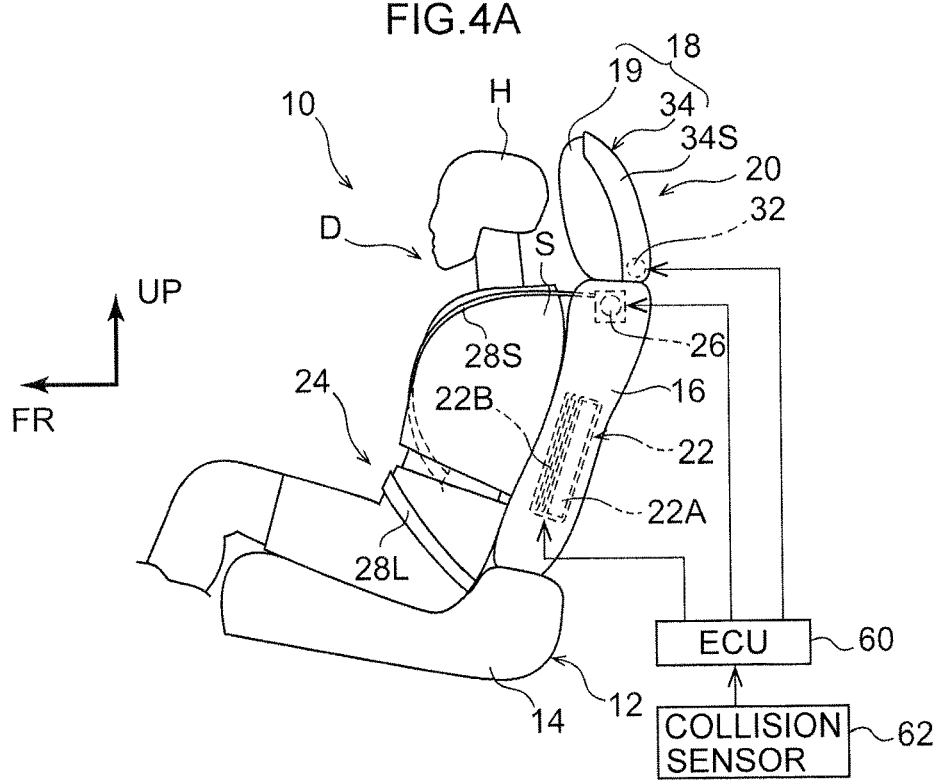
FIG. 4A is a side view illustrating an overall outline configuration prior to actuation of an occupant protection device according to the first exemplary embodiment of the present invention.

As illustrated in FIGS. 1 and 4A, the multidirectional airbag device 20 is configured including a multidirectional airbag 30, serving as an airbag, an inflator 32, and the module case (also referred to as an airbag case) 34. The multidirectional airbag 30 is housed inside the module case 34 folded in a state connected to the inflator 32 so as to be capable of being supplied with gas, as described later. The multidirectional airbag device 20 that is modularized in this manner is provided in the headrest 18, above the seatback 16. Specific explanation follows thereof.

Multidirectional Airbag

As illustrated in plan view cross-section in FIG. 3A, the multidirectional airbag 30 is configured as an integral bag body that inflates and deploys so as to surround the head H of the seated occupant D (also referred to below as simply the "head H") from the front and from both left and right sides. More specifically, as illustrated in FIGS. 1 to 3B, the multidirectional airbag 30 is configured including frame ducts 35 that are each inflated and deployed in a duct shape, a front deployment section 36 that deploys in front of the head H, and a pair of lateral deployment sections 38 that deploy at both the left and right sides of the head H.

The multidirectional airbag 30 is configured as an integral bag body in which at least the frame ducts 35, a front inflating portion 40, described later, of the front deployment section 36, and lateral inflating portions 44, described later, of the lateral deployment sections 38 are partitioned from each other in a communicating state, and is housed in the headrest 18 in the folded state. The multidirectional airbag 30 of the present exemplary embodiment is also configured including an upper deployment section 48 that is deployed above the head H, and a delayed deployment section 50 including a delayed inflating portion 51 that is inflated and deployed at the rear side of the front inflating portion 40.

Frame Ducts

A pair of the frame ducts 35 are respectively provided at both seat width direction sides, and each frame duct 35 is configured so as to inflate and deploy in a "U" shape opening downward as viewed from the side. Specifically, in an inflated and deployed state as viewed from the side, each frame duct 35 includes a rear duct 35R that extends up and down along the headrest 18, an upper duct 35U that extends from an upper end of the rear duct 35R toward the front, and a front duct 35F that hangs down from a front end of the upper duct 35U. As illustrated in the flat pattern in FIG. 6, a supply tube 56 forming a gas supply port that supplies gas from the inflator 32, as described later, is linked to a lower end of each rear duct 35R.

Front Deployment Section

The front deployment section 36 is configured including the front inflating portion 40 that is deployed in front of the head H, and a non-inflating portion 42 that partitions the front inflating portion 40 into plural inflating portions. In the present exemplary embodiment, the front inflating portion 40 is configured such that an upper inflating portion 40U, a central inflating portion 40C, and a lower inflating portion 40L, each inflated and deployed with its length direction along the seat width direction, are inflated side-by-side in the above sequence, from above. Namely, the front inflating portion 40 is configured including the upper inflating portion 40U, the central inflating portion 40C, and the lower inflating portion 40L as relevant portions. The upper inflating portion 40U and the central inflating portion 40C are configured so as to inflate and deploy in front of the head H, and correspond to a width direction inflating portion of the present invention. The lower inflating portion 40L is configured so as to inflate and deploy in front of the chest B and shoulders S of the seated occupant D.

Both seat width direction ends of the front inflating portion 40 are connected to the front ducts 35F of the frame ducts 35 positioned at both seat width direction sides. The front inflating portion 40 is separated from the front ducts 35F with end seams 42E, these being portions of seams configuring the non-inflating portion 42 that close off both length direction end portions of the upper inflating portion 40U and the central inflating portion 40C, as boundaries configured of joint portions therebetween. Both length direction ends of the lower inflating portion 40L of the front inflating portion 40 are in communication with respective lower portions of the front ducts 35F through communicating paths 40R1 (see FIG. 6). Thus, in the present exemplary embodiment, connecting locations between the front inflating portion 40 and the front ducts 35F are configured including joint portions and communicating portions.

Lateral Deployment Sections

The pair of lateral deployment sections 38 are configured including the lateral inflating portions 44 that are inflated and deployed at both left and right sides of the head H on being supplied with gas, and non-inflating portions 46 that partition the respective lateral inflating portions 44 into plural inflating portions. In the present exemplary embodiment, the lateral deployment sections 38 in the inflated and deployed state are each surrounded from three sides, these being from the rear, above, and front, by the respective frame duct 35, and each has a substantially rectangular shape as viewed from the side. The lateral deployment sections 38 are each of a size (surface area) that overlaps with substantially the entire head H as viewed from the side. The lateral inflating portion 44 of each lateral deployment section 38 is separated from the frame duct 35 by a U-shaped seam 46A, which is a seam configuring the non-inflating portion 46 and forms an inverted U shape opening downward.

Each non-inflating portion 46 is configured including a front and rear pair of lateral seams 46B that extend from a lower edge of the respective lateral inflating portion 44 to inside the opening of the U-shaped seam 46A. Due to the pair of lateral seams 46B partitioning a lower portion of the lateral inflating portion 44 into three inflating portions arrayed from front to rear, in the inflated and deployed state, a front-rear length of the lower portion of the lateral inflating portion 44 in plan view cross-section is shorter than a front-rear length of an upper portion of the lateral inflating portion 44 in plan view cross-section.

Figure 3A:
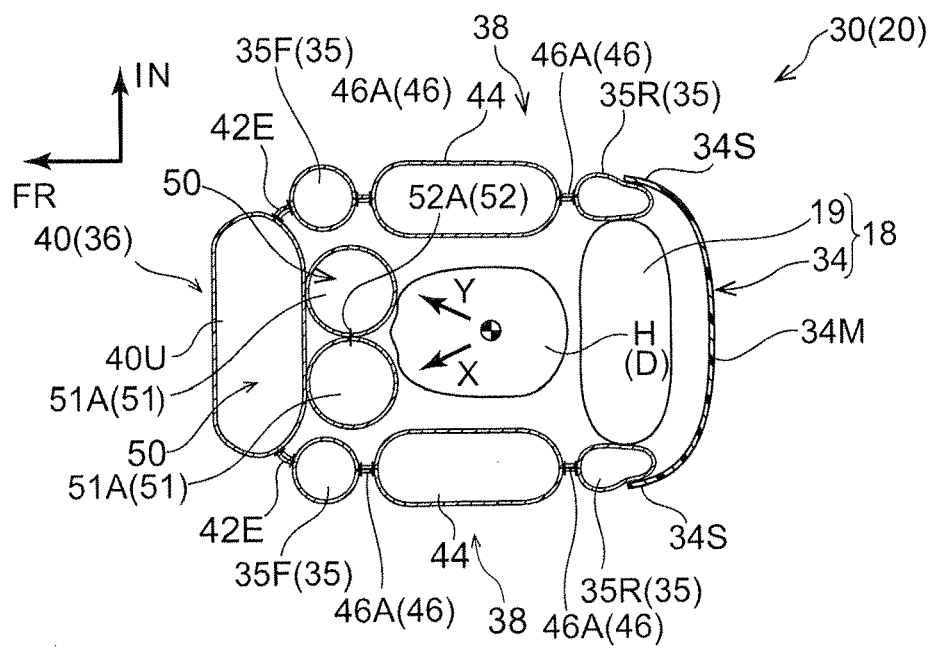
FIG. 3A is a cross-section along line 3A-3A in FIG. 1, illustrating an inflated and deployed state of a multidirectional airbag configuring an occupant protection device according to the first exemplary embodiment of the present invention.
Figure 3B:
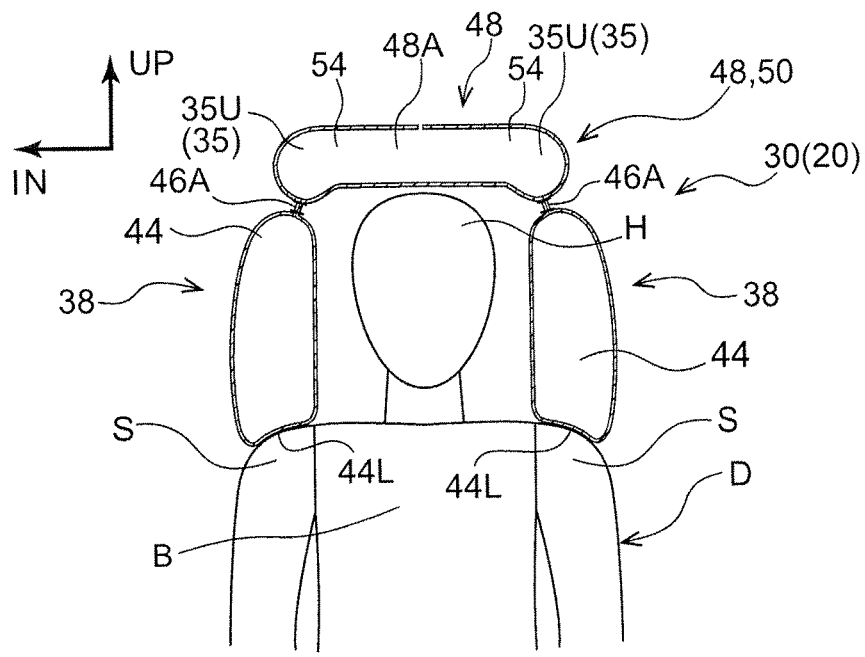
FIG. 3B is a cross-section along line 3B-3B in FIG. 1, illustrating an inflated and deployed state of a multidirectional airbag configuring an occupant protection device according to the first exemplary embodiment of the present invention.

As illustrated in FIG. 3B, in an inflated and deployed state of the multidirectional airbag 30, lower ends 44L of the respective lateral inflating portions 44 of the left and right lateral deployment sections 38 make contact with the tops of the shoulders S of the seated occupant D. The contact between the lower ends 44L of the lateral inflating portions 44 and the shoulders S is configured so as to determine the up-down direction position of the multidirectional airbag 30 in the inflated and deployed state with respect to (the head H of) the seated occupant D. In this positioning state, the multidirectional airbag 30 is configured such that neither the front deployment section 36, the left or right lateral deployment sections 38, nor the upper deployment section 48, described below, contact the head H (a gap is formed therebetween) when the seated occupant D has adopted a normal seated posture.

Upper Deployment Section and Rear Deployment Section

Figure 6:
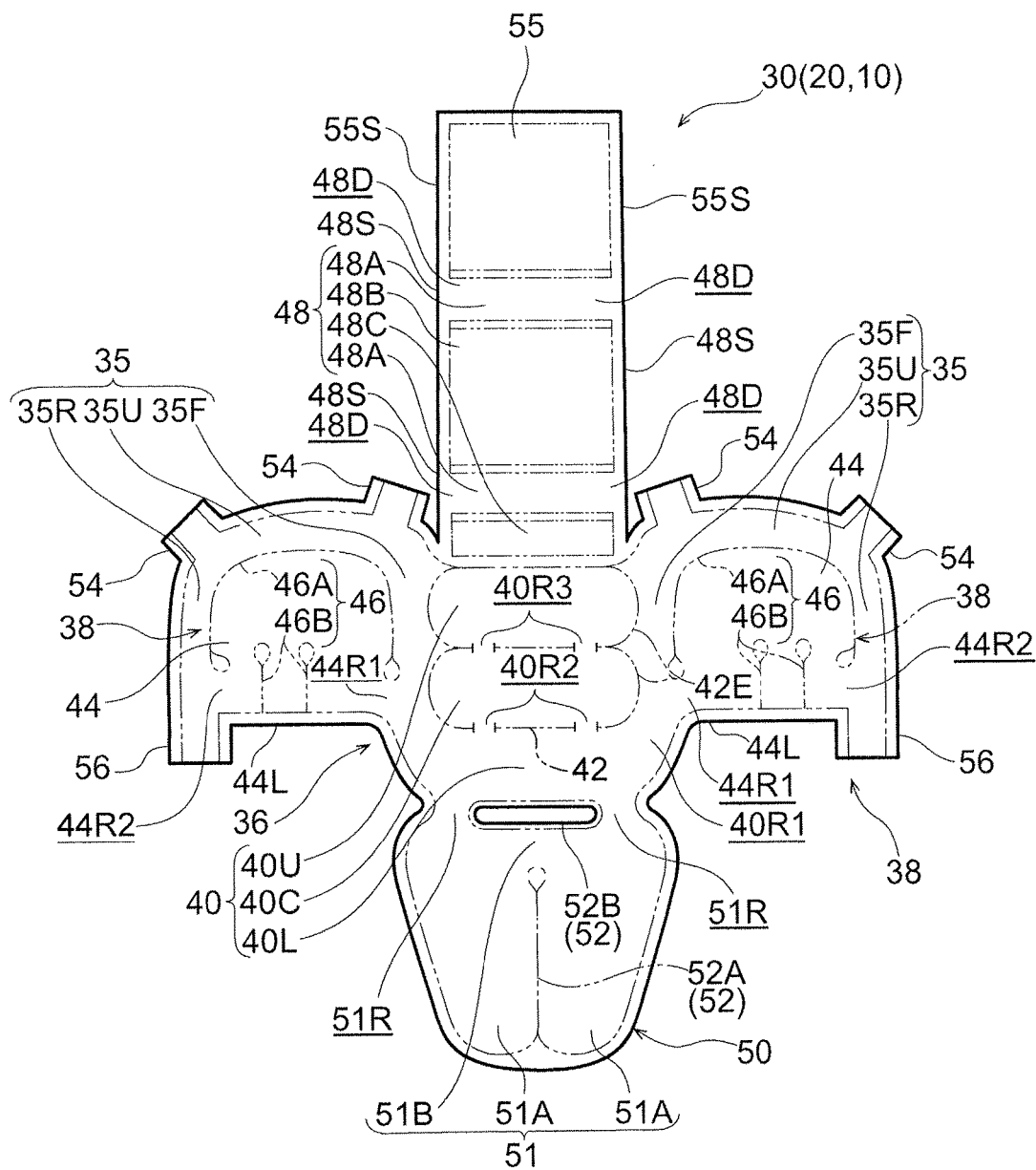
FIG. 6 is a diagram illustrating a flat pattern of a multidirectional airbag configuring an occupant protection device according to the first exemplary embodiment of the present invention.

As illustrated in FIG. 6, the upper deployment section 48 is configured including a front and rear pair of cross inflating portions 48A each inflated and deployed with its length direction along the seat width direction, and a patch shaped non-inflating portion 48B that links the front and rear cross inflating portions 48A together. The upper deployment section 48 is also configured including a patch shaped non-inflating portion 48C that links the cross inflating portion 48A at the front side together with an upper end (the upper inflating portion 40U) of the front deployment section 36. Note that the cross inflating portion 48A at the rear side is connected (not illustrated in the drawings) to the module case 34 through a rear deployment section 55. In the present exemplary embodiment, the rear deployment section 55 is a patch shaped non-inflating portion.

The front and rear cross inflating portions 48A are supplied with gas from the upper ducts 35U of the frame ducts 35, as described later, and are inflated and deployed so as to couple (connect in a communicating state) the pair of upper ducts 35U in the seat width direction. A continuous, integral inflating portion, configured of the front and rear cross inflating portions 48A together with the upper ducts 35U, is thereby deployed above the head H. The non-inflating portion 48B is deployed between the front and rear cross inflating portions 48A such that the upper ducts 35U are linked in the seat width direction. The rear deployment section 55 is deployed such that the rear ducts 35R of the pair of frame ducts 35 are linked in the seat width direction.

Delayed Deployment Section

As illustrated in FIG. 6, the delayed deployment section 50 is configured including the delayed inflating portion 51 that deploys in front of the head H, and a non-inflating portion 52 that partitions the delayed inflating portion 51 into plural inflating portions. In the present exemplary embodiment, the delayed inflating portion 51 is configured including a pair of up-down inflating portions 51A that are inflated and deployed adjacent to each other in the seat width direction with their length directions along the up-down direction, and an upper body restraint portion 51B that is inflated and deployed below the up-down inflating portions 51A. The pair of up-down inflating portions 51A are configured so as to inflate and deploy in front of the head H, and the upper body restraint portion 51B is configured so as to inflate and deploy in front of the chest B and shoulders S of the seated occupant D.

The non-inflating portion 52 is configured including a non-inflating portion 52A that partitions the pair of up-down inflating portions 51A, and a non-inflating portion 52B that is interposed between the upper body restraint portion 51B and the lower inflating portion 40L of the front inflating portion 40. In the present exemplary embodiment, the non-inflating portion 52A is configured by a line shaped seam extending up and down, and the non-inflating portion 52B is configured as a portion surrounded by a ring (endless) shaped seam extending along the seat width direction.

The delayed deployment section 50 is inflated and deployed by the upper body restraint portion 51B receiving gas supplied through communicating paths 51R, serving as a gas supply section from the inflated and deployed front inflating portion 40 (the lower inflating portion 40L in the present exemplary embodiment). The communicating paths 51R are gas through-paths that place a lower portion (lower end portion) of the lower inflating portion 40L in the inflated and deployed state and a lower portion (lower end portion) of the upper body restraint portion 51B in communication with each other. In the present exemplary embodiment, one of the communicating paths 51R is disposed at either seat width direction side of the non-inflating portion 52B, namely, at either seat width direction end portion of a boundary between the upper body restraint portion 51B and the lower inflating portion 40L.

Flat Pattern

Explanation follows regarding gas supply paths to the respective portions of the multidirectional airbag 30, with reference to the flat pattern illustrated in FIG. 6. The multidirectional airbag 30 is laid out in an opened-out shape (flat pattern) as illustrated in FIG. 6 prior to joining part of a peripheral edge portion, and prior to folding. The multidirectional airbag 30 with this opened-out shape is formed as a One Piece Woven (OPW) integral bag body. Note that, for example, the multidirectional airbag 30 may be formed into an integral bag body by a method of stitching together (cutting and sewing) peripheral edges of two pieces of woven material.

From the state of the multidirectional airbag 30 illustrated in FIG. 6, the upper ducts 35U of the frame ducts 35 are joined by stitching or the like to respective side edges 48S of the upper deployment section 48, and the rear ducts 35R of the frame ducts 35 are joined by stitching or the like to respective side edges 55S of the rear deployment section 55 (not illustrated in the drawings). In a state in which one ends of a front and rear pair of communicating tubes 54, which project out from the upper duct 35U of each frame duct 35, are in communication with the upper duct 35U, other ends of the communicating tubes 54 are respectively joined in a communicating state to opening end portions 48D at either seat width direction end of the cross inflating portions 48A by stitching or the like. The supply tubes 56 that are in communication with the respective rear ducts 35R of the frame ducts 35 project downward from the lower ends of the rear ducts 35R.

The left and right supply tubes 56 are disposed inside the module case 34 on either seat width direction side of the headrest 18, and gas from the inflator 32 passes through the respective supply tubes 56. Namely, the multidirectional airbag 30 is configured such that gas is first supplied to the frame ducts 35 through the left and right supply tubes 56. Although not illustrated in the drawings, the inflator 32 is connected to the left and right supply tubes 56 in a communicating state through a branching means such as a diffuser.

As described above, in the multidirectional airbag 30, gas is supplied from the frame ducts 35 to the front inflating portion 40 through the communicating paths 40R1 formed at both seat width direction side end portions of the lower inflating portion 40L of the front inflating portion 40. The front inflating portion 40 is configured such that gas that has been supplied to the lower inflating portion 40L is supplied to the central inflating portion 40C and the upper inflating portion 40U through communicating paths 40R2, 40R3 provided at parts of the non-inflating portion 42.

In the multidirectional airbag 30, gas is also supplied from the frame ducts 35 to the lateral inflating portions 44 through communicating paths 44R1 respectively formed below lower front ends of the U-shaped seams 46A of the lateral inflating portions 44. In the present exemplary embodiment, gas is also supplied from the frame ducts 35 to the lateral inflating portions 44 through communicating paths 44R2 respectively formed below lower rear ends of the U-shaped seams 46A of the lateral inflating portions 44. Note that the multidirectional airbag 30 may be configured such that the communicating paths 44R2 are not formed.

As described above, the delayed deployment section 50 is configured such that gas is supplied from the lower inflating portion 40L through the communicating paths 51R. The delayed deployment section 50 is folded back and superimposed on the front deployment section 36 at locations where the communicating paths 51R are formed, such that the communicating paths 51R are closed off and substantially no gas is supplied (flows) into the delayed inflating portion 51 until the internal pressure of the front inflating portion 40 reaches a specific internal pressure. The folded and superimposed delayed deployment section 50 may be joined to the front inflating portion 40 by stitching or the like.

Other

The multidirectional airbag 30 explained above is folded from a state in which parts of the peripheral edges in the flat pattern have been joined as described above, and is housed inside the headrest 18 (module case 34). A folding mode of the multidirectional airbag 30, as well as configuration of a deployment guide cloth 58, is explained later together with configuration of the module case 34.

Figure 2:
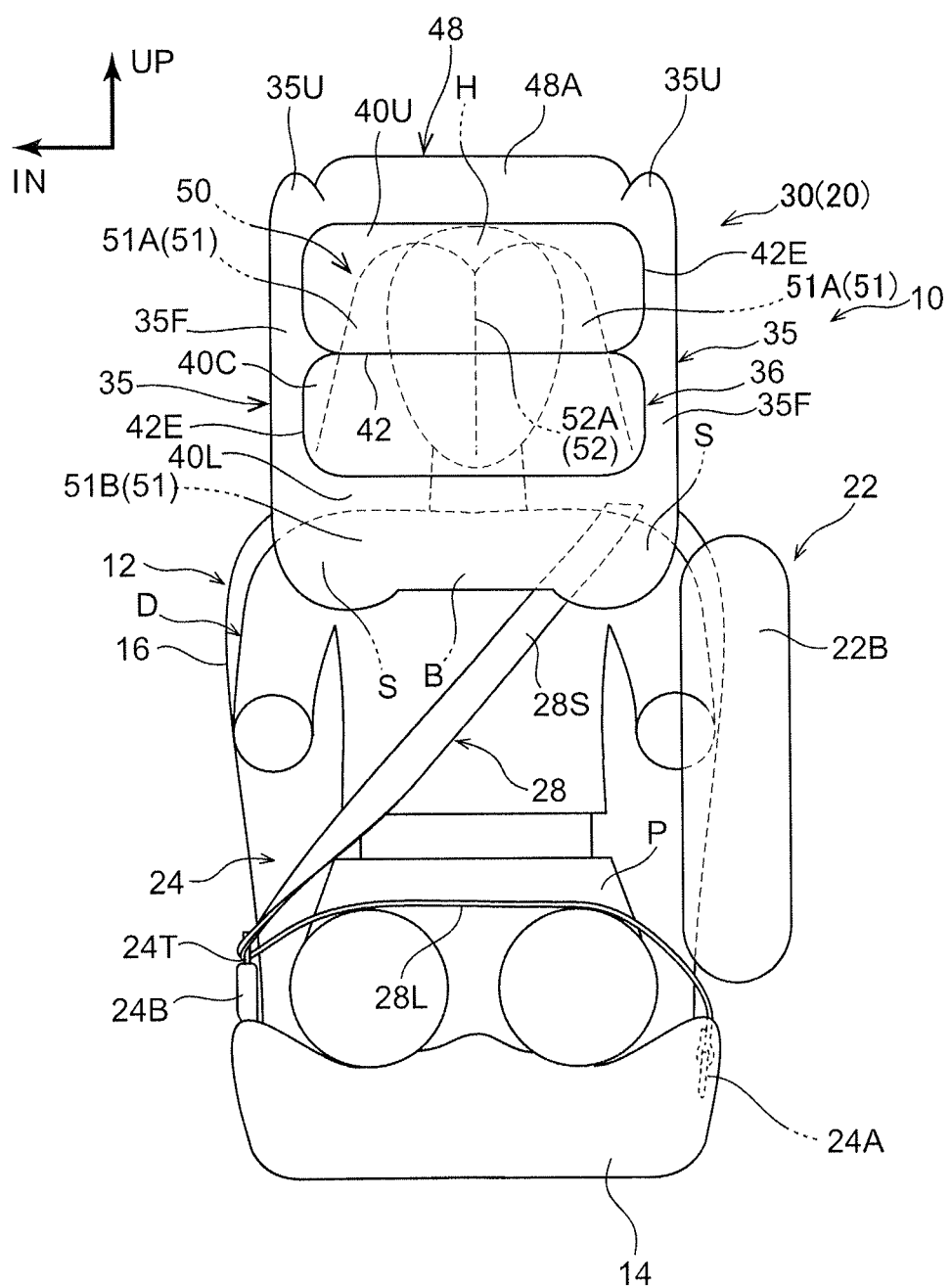
FIG. 2 is a face-on view schematically illustrating an actuated state of an occupant protection device according to the first exemplary embodiment of the present invention.

As illustrated in FIG. 1, configuration is made such that in a non-restraining inflated and deployed state of the multidirectional airbag 30 in which the seated occupant D is not being restrained, as viewed from the side, the multidirectional airbag 30 is not superimposed with (does not overlap) the side airbag 22B that is in a non-restraining inflated and deployed state in which the seated occupant D is not being restrained. In other words, the multidirectional airbag 30 and the side airbag 22B are configured so as not to include inflating and deploying portions that overlap each other when both are in non-restraining inflated and deployed states, at least as viewed from the side. Moreover, as illustrated in FIG. 2, in the non-restraining inflated and deployed state, the multidirectional airbag 30 is configured so as not to be superimposed on the side airbag 22B in the non-restraining inflated and deployed state in which the seated occupant D is not restrained, as viewed from the front.

Inflator

A combustion type or cold gas type inflator is employed as the inflator 32, and gas generated on actuation is supplied into the multidirectional airbag 30. In the present exemplary embodiment, the inflator 32 is configured by a cylinder type inflator, and is disposed inside the module case 34 with its length direction along the seat width direction. Actuation of the inflator 32 is controlled by the ECU 60, serving as a controller, described later.

Module Case

As illustrated in FIGS. 1 and 5, the module case 34 is disposed at the rear of the headrest main body 19 on the seatback 16. In the present exemplary embodiment, the module case 34 is a back board configuring (a rear design portion of) the headrest 18. Namely, the module case 34 of the present exemplary embodiment is configured serving as both an element of the multidirectional airbag device 20 and an element of the headrest 18. The multidirectional airbag 30 is therefore provided disposed inside (at the interior of) a rear portion of the headrest 18.

The module case 34 projects out further upward than an upper end of the headrest body 19 and juts out at both seat width direction sides of the headrest body 19, as viewed from the front. Namely, the module case 34 covers the headrest body 19 from the rear. In the present exemplary embodiment, the module case 34 covers a rear portion of the headrest body 19 from above and from both left and right sides, and configures the rear design portion of the headrest 18 as described above.

More specifically, as relevant portions, the module case 34 is configured by a base portion 34B, a main wall 34M, serving as a rear wall, and a pair of side walls 34S that face each other in the seat width direction. The base portion 34B configures a fixing portion to the upper end of the seatback 16.

The main wall 34M extends out upward from a rear end of the base portion 34B, and is tilted forward such that an upper end of the main wall 34M is positioned further forward than a lower end of the main wall 34M that is fixed to the seatback 16. As viewed from the side, the main wall 34M configures a curved shape protruding upward and rearward. As viewed from the front, the main wall 34M projects out further upward than the upper end of the headrest body 19, and juts out at both seat width direction sides of the headrest body 19.

A space in which the multidirectional airbag 30 is housed in a folded state is formed between the main wall 34M and the headrest body 19. The upper end of the main wall 34M reaches above the headrest main body 19. Configuration is made such that the multidirectional airbag 30 passes between an upper end portion of the main wall 34M and the headrest main body 19 during an inflation and deployment process.

The pair of side walls 34S extend out from both seat width direction ends of the main wall 34M toward the front, and cover the rear portion of the headrest body 19, as viewed from the side. Configuration is made such that in the inflated and deployed state of the multidirectional airbag 30, mainly the rear ducts 35R pass between the pair of side walls 34S and the headrest body 19.

As explained above, the multidirectional airbag 30 is housed in a folded state between the module case 34 and the headrest main body 19. The left and right supply tubes 56 of the multidirectional airbag 30 are disposed inside the module case 34 on either seat width direction side of the headrest main body 19, as described above. The inflator 32 that is connected to the left and right supply tubes 56 through a branching means such as a diffuser is fastened to a seatback frame in a state in which a stud bolt of the inflator 32 has been pierced through the base portion 34B of the module case 34.

The multidirectional airbag 30 is rolled up outward and housed inside the module case 34. As illustrated in FIG. 5, as viewed from the side, rolling up outward refers to a mode of folding into a rolled-up shape from a front end side toward the upper side and rear side, so as to fold up in the opposite direction to that during a deployment process of the frame ducts 35. In other words, as illustrated by the imaginary lines in FIG. 5, rolling up outward is a mode of folding in which a rolled-up portion 30R is positioned at the opposite side to the head H side in the deployment process of the multidirectional airbag 30. As described above, in the multidirectional airbag 30, in which the lateral deployment sections 38 are joined to the upper deployment section 48 and the rear deployment section 55, the lateral deployment sections 38 are folded inward prior to the front deployment section 36 and the frame ducts 35 being rolled up outward.

At least part of the multidirectional airbag 30 in the folded state is disposed at the rear of the upper portions 19SU and the intermediate portions 19SC of the headrest stays 19S of the headrest main body 19. In the headrest main body 19 of the present exemplary embodiment, a thin cushioning material (pad) 19C is formed at the rear of the upper portions 19SU and the intermediate portions 19SC of the headrest stays 19S, and a folded state housing space is formed between the cushioning material 19C and the module case 34. Configuration is such that, on receiving gas supplied from the inflator 32, the multidirectional airbag 30 is inflated and deployed from between the cushioning material 19C and the module case 34 toward the outside of the module case 34, while unraveling from being rolled up outward.

The main wall 34M of the module case 34 is configured so as to support the multidirectional airbag 30 from the rear (bear reaction force in order to proceed forward) in the inflation and deployment process when this occurs. Since the main wall 34M of the module case 34 has a curved shape as viewed from the side as described above, the main wall 34M is configured to guide the multidirectional airbag 30 toward the front (forward and upward) in the inflation and deployment process when this occurs. Thus, the main wall 34M of the present exemplary embodiment functions as a supporting wall and a guiding wall.

The deployment guide cloth 58, serving as a guide cloth, is folded and housed together with the multidirectional airbag 30 inside the module case 34. A base portion of the deployment guide cloth 58 inside the module case 34, disposed at the outside (the main wall 34M side) of the multidirectional airbag 30 that has been rolled up outward as described above, is connected to the inflator 32, or the rear deployment section 55, this being a portion at a base end side of the multidirectional airbag 30. A leading end side of the deployment guide cloth 58 is disposed at the inside (the headrest 18 side) of the outward rolled-up portion 30R of the multidirectional airbag 30, so as to cover the rolled-up portion 30R in the opposite direction (the counterclockwise direction) to the rolling direction (the clockwise direction in FIG. 5).

As illustrated by the imaginary lines in FIG. 5, the deployment guide cloth 58 is led out of the module case 34 accompanying inflation and deployment (unraveling of the rolling) of the multidirectional airbag 30, and the deployment guide cloth 58 is deployed ahead of the multidirectional airbag 30, between the multidirectional airbag 30 and a vehicle compartment ceiling. The deployment guide cloth 58 has a smaller coefficient of friction with respect to the multidirectional airbag 30 than a ceiling material of the automobile installed with the occupant protection device 10. In the present exemplary embodiment, a face on the vehicle compartment ceiling side of the deployment guide cloth 58 is silicone coated, and a face of the deployment guide cloth 58 that contacts the multidirectional airbag 30 is configured as a low friction face that is not silicone coated.

Figure 4B:
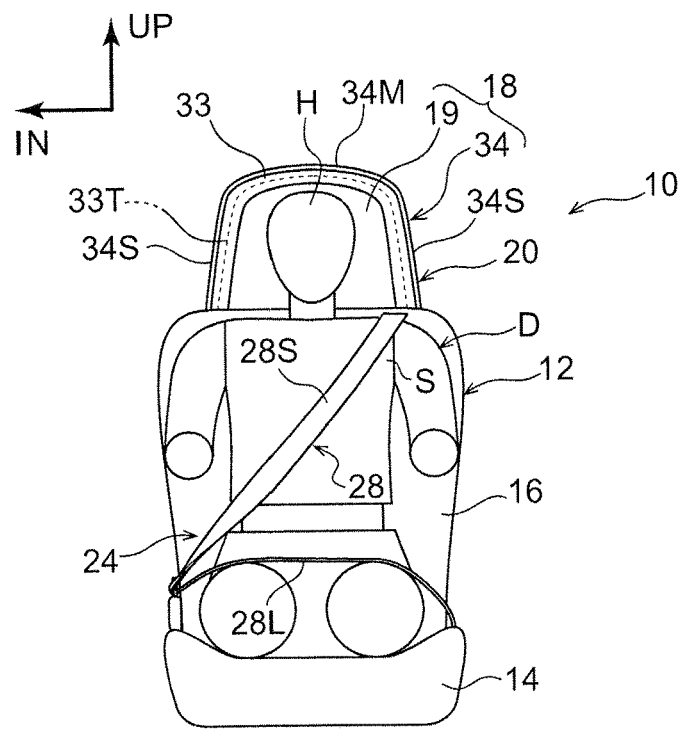
FIG. 4B is a face-on view illustrating an overall outline configuration prior to actuation of an occupant protection device according to the first exemplary embodiment of the present invention.

As illustrated in FIG. 4B, as viewed from the front, an airbag door 33 closes off between the module case 34 and the headrest body 19. The airbag door 33 is configured so as to split open about a tear line 33T, this being a weakened portion, under deployment pressure of the multidirectional airbag 30, thereby allowing the multidirectional airbag 30 to inflate and deploy toward the front.

ECU Configuration

As illustrated in FIG. 4A, the multidirectional airbag device 20, the side airbag device 22, and the seatbelt device 24 configuring the occupant protection device 10 are controlled by the ECU 60, serving as a controller. Specifically, the inflator 32 of the multidirectional airbag device 20, the inflator 22A of the side airbag device 22, and the retractor 26 (pre-tensioner function) of the seatbelt device 24 are each electrically connected to the ECU 60. The ECU 60 is electrically connected to a collision sensor 62 (or sensor group).

The ECU 60 is capable of detecting or predicting (the occurrence or inevitability of) various modes of frontal collision to the automobile to which it is installed, by collision mode, described later, based on data from the collision sensor 62. The ECU 60 is also capable of detecting or predicting (the occurrence or inevitability of) a side-on collision to the automobile to which it is installed based on data from the collision sensor 62.

When a side-on collision is detected or predicted based on data from the collision sensor 62, the ECU 60 actuates the inflators 22A, 32. When a frontal collision is detected or predicted based on data from the collision sensor 62, the ECU 60 actuates the inflator 32 and the retractor 26. Note that frontal collision modes in which the ECU 60 actuates the inflator 32 and the retractor 26 include a full overlap frontal collision, and an offset frontal collision.

When the ECU 60 detects or predicts a frontal collision that is a frontal collision at a position offset toward one vehicle width direction side by a specific value or greater based on data from the collision sensor 62, the ECU 60 actuates the inflators 22A, 32 and the retractor 26. Such frontal collisions at a position offset toward one vehicle width direction side by a specific value or greater include oblique collisions, small overlap collisions, and the like.

Note that an oblique collision (MDB oblique collision) is, for example, defined by the NHTSA as a collision from the oblique front (such as a collision with a relative angle of 15° with the colliding party and with a vehicle width direction overlap amount of approximately 35%). In the present exemplary embodiment, as an example, an oblique collision at a relative speed of 90 km/h is envisaged. A small overlap collision is, for example, defined by the IIHS as a automobile frontal collision in which a vehicle width direction overlap amount with the colliding party is 25% or lower. For example, a collision at the vehicle width direction outside of a front side member, this being a vehicle body frame, corresponds to a small overlap collision. In the present exemplary embodiment, as an example, a small overlap collision at a relative speed of 64 km/h is envisaged.

Operation and Advantageous Effects

Explanation follows regarding operation and advantageous effects of the first exemplary embodiment. Explanation first follows regarding basic operation with respect to deployment performance of the multidirectional airbag 30 and restraint performance of the head H, then explanation follows regarding operation in protecting a seated occupant in various collision modes, and other operation with respect to deployment performance of the multidirectional airbag 30 and so on.

Explanation of Basic Operation

On being supplied with gas from the inflator 32, the multidirectional airbag 30 is guided by the module case 34 and the deployment guide cloth 58, and is inflated and deployed from the headrest 18 toward the front while unraveling from being rolled up outward. Operation and advantageous effect of the module case 34, the deployment guide cloth 58, and being rolled up outward are described later.

To explain specifically regarding inflation and deployment of the multidirectional airbag 30, when gas is supplied from the left and right supply tubes 56 to the left and right frame ducts 35 in the multidirectional airbag 30, the frame ducts 35 are inflated and deployed in the sequence of the rear ducts 35R, the upper ducts 35U, then the front ducts 35F. When this occurs, the upper ducts 35U are inflated and deployed toward the front above the head H as viewed from the side, and the front ends of the upper ducts 35U pass above the head H. The front inflating portion 40 receives gas supplied from the frame ducts 35 through the communicating paths 40R1 and is inflated and deployed in front of the head H. The pair of lateral inflating portions 44 receive gas supplied from the frame ducts 35 through the respective communicating paths 44R1, 44R2, and are inflated and deployed at the sides of the head H so as to sandwich the head H in the seat width direction. Thus, the head H is surrounded from the front and both seat width direction sides (three sides) by the front deployment section 36 including the front inflating portion 40, and the pair of lateral deployment sections 38 respectively including the lateral inflating portions 44.

Note that the upper ducts 35U, the front ends of which reach in front of the head H as viewed from the seat width direction, are inflated and deployed in advance of the front inflating portion 40 and the lateral inflating portions 44. After the front ends of the upper ducts 35U have extended beyond the head H in the inflation and deployment process of the multidirectional airbag 30, gas supplied from the front ducts 35F of the frame ducts 35 including the upper ducts 35U, the front ducts 35F having reached in front of the head H, is received by the front inflating portion 40, which is inflated and deployed in front of the head H. This enables the front inflating portion 40 to be inflated and deployed in front of the head H with a high degree of certainty. This also enables the front inflating portion 40 to be inflated and deployed closer to the head H than in configurations which do not include the frame ducts 35 that contribute to deployment performance in this manner.

Thus, in the occupant protection device 10 according to the first exemplary embodiment, the configuration in which the multidirectional airbag 30 configured as an integral bag body is housed inside the headrest 18 enables both deployment performance of the multidirectional airbag 30 in order to inflate and deploy the front inflating portion 40 in front of the head H, and restraint performance of the head H by the multidirectional airbag 30, to be achieved.

Note that, in cases of a comparative mode in which the delayed inflating portion 51 is not included, although there is no issue from the perspective of deployment performance of a multidirectional airbag, there is a limit to the extent to which the front inflating portion 40 can be made to approach the head H when inflation and deployment is complete.

In cases of a comparative example in which the delayed inflating portion 51 is not included, but a front inflating portion that has a larger capacity than the front inflating portion 40 by the amount of capacity of the delayed inflating portion 51 is included, the front inflating portion of the multidirectional airbag is liable to impinge on the head H or the roof in the process of passing above the head H while inflating and deploying. Inflation and deployment in an appropriate orientation or placement is sometimes impeded when the multidirectional airbag impinges on the head H or the roof in the inflation and deployment process.

Note that in the occupant protection device 10, almost no gas is supplied to the delayed inflating portion 51 during the inflation and deployment process of the frame ducts 35 and the front inflating portion 40. Thus, the front inflating portion 40 is suppressed from impinging on the head H or the roof in the inflation and deployment process. After the front inflating portion 40 has inflated and deployed, gas is supplied to the delayed inflating portion 51 through the communicating paths 51R formed at folded-back portions from the front inflating portion 40. The delayed inflating portion 51 is accordingly inflated and deployed between the front inflating portion 40 and the head H. Namely, the multidirectional airbag 30 enables the delayed inflating portion 51 to be inflated and deployed closer the front side of the head H than in comparative modes in which the delayed inflating portion 51 is not included.

Thus, the occupant protection device 10 enables the multidirectional airbag 30 to be deployed even closer to the head H while securing deployment performance of the multidirectional airbag 30 housed inside the headrest 18, improving restraint performance of the head H by the multidirectional airbag 30. Namely, the occupant protection device 10 enables both deployment performance of the multidirectional airbag 30 and restraint performance of the head H by the multidirectional airbag 30 to be achieved to a greater extent.

In the Event of a Side-on Collision

When the ECU 60 detects or predicts a side-on collision based on data from the collision sensor 62, the ECU 60 actuates the inflators 22A, 32. Thus, as illustrated in FIGS. 1 and 2, the side airbag 22B of the side airbag device 22 is inflated and deployed at the vehicle width direction outside of the seated occupant D, and the multidirectional airbag 30 of the multidirectional airbag device 20 is inflated and deployed so as to surround the head H of the seated occupant D. A nearside side-on collision, explained below, is a side-on collision at the near side, in which the collision is at a vehicle side face at the side nearest to the seated occupant D in the vehicle width direction. A far-side side-on collision is a side-on collision at the far side, in which the collision is at a vehicle side face at the side furthest from the seated occupant D in the vehicle width direction. Thus, in cases in which the seated occupant D is an occupant of the driving seat, for example, a nearside side-on collision is a side-on collision at the driving seat side, and a far-side side-on collision is a side-on collision at a front passenger seat side.

Nearside Side-On Collisions

When a side-on collision has occurred on the vehicle width direction side installed with the vehicle seat 12, movement of the upper body of the seated occupant D toward a side door side is limited by the side airbag 22B, and movement of the head H of the seated occupant D toward a side window glass side is limited by the lateral deployment section 38 on the vehicle width direction outside. Namely, the upper body and head H of the seated occupant D are restrained and protected in a side-on collision by the side airbag 22B and the lateral deployment section 38 on the vehicle width direction outside.

This enables movement of the head H toward the collision side to be limited. Moreover, since the lateral deployment section 38 includes the lateral inflating portion 44, deformation of the lateral inflating portion 44 functions to absorb energy during the restraint process of the head H. For example, the peak load input to the head H can be kept small even when the head H moves as far as the side window glass.

Moreover, when the seated occupant D swings back after being protected by the side airbag 22B and the lateral deployment section 38 on the vehicle width direction outside, movement of the head H of the seated occupant D toward the collision-opposite side is limited by the lateral deployment section 38 on the vehicle width direction central side. For example, the head H of the seated occupant D is thereby suppressed from impinging on the seatback of an adjacent seat or an occupant in the adjacent seat.

Far-Side Side-On Collisions

On the other hand, when a side-on collision has occurred on the vehicle width direction opposite side to the side installed with the vehicle seat 12, movement of the head H of the seated occupant D toward the collision side (vehicle width direction central side) is limited by the lateral deployment section 38 on the vehicle width direction central side. Namely, the head H of the seated occupant D is restrained and protected in a side-on collision by the lateral deployment section 38 on the vehicle width direction central side.

This enables movement of the head H toward the collision side to be limited. Moreover, since the lateral deployment section 38 includes the lateral inflating portion 44, deformation of the lateral inflating portion 44 functions to absorb energy during the restraint process of the head H. For example, the peak load input to the head H can be kept small even when the head H moves as far as a region where it might impinge on the seatback of the adjacent seat or an occupant in the adjacent seat.

Moreover, when the head H of the seated occupant D swings back after being protected by the lateral deployment section 38 on the vehicle width direction central side, movement of the seated occupant D toward the collision-opposite side is limited by the lateral deployment section 38 on the vehicle width direction outside, and by the side airbag 22B. For example, the head H of the seated occupant D is thereby suppressed from impinging on the side window glass.

Full Overlap or Offset Frontal Collisions

When the ECU 60 has detected or predicted a full overlap frontal collision based on data from the collision sensor 62, the ECU 60 actuates the inflator 32 and the retractor 26. The belt 28 of the seatbelt device 24 is thereby forcibly taken up by the retractor 26, and the multidirectional airbag 30 of the multidirectional airbag device 20 is then inflated and deployed so as to surround the head H of the seated occupant D.

In a full overlap frontal collision, the seated occupant D moves straight toward the front under inertia. Note that the movement of the seated occupant D, who is wearing the belt 28 of the seatbelt device 24, toward the front has a mode that tilts the upper body of the seated occupant D about the waist P. The head H of the seated occupant D contacts the delayed deployment section 50 of the multidirectional airbag 30 while the seated occupant D is restrained by (receives resistance to the forward movement from) the shoulder belt 28S. Thus, movement of the head H toward the front is limited by the delayed inflating portion 51 of the delayed deployment section 50, and the upper inflating portion 40U and the central inflating portion 40C of the front deployment section 36. Moreover, the upper body restraint portion 51B of the delayed inflating portion 51 contacts the chest B and shoulders S of the seated occupant D from the front, and movement of the upper body (head H) of the seated occupant D toward the front is limited by the lower inflating portion 40L of the front inflating portion 40 and the upper body restraint portion 51B.

The head H and upper body of the seated occupant D is restrained by the delayed deployment section 50 and the front deployment section 36 in this manner, and the seated occupant D is protected in a full overlap frontal collision. Namely movement of the head H and upper body of the seated occupant D toward the front can be limited.

Moreover, since the front inflating portion 40 of the front deployment section 36 and the delayed inflating portion 51 of the delayed deployment section 50 are inflated and deployed in front of the seated occupant D, deformation of the front inflating portion 40 and the delayed inflating portion 51 functions to absorb energy during the restraint process of the head H, chest B, and shoulders S. Thus, for example, the peak load input to the head H can be kept small, even when the head H moves as far as a region where it might impinge on a vehicle compartment interior component (such as a steering wheel or instrument panel).

Explanation has been given regarding a case of a full overlap frontal collision; however, in a case of an offset frontal collision in which, for example, a vehicle width direction overlap amount with another vehicle is approximately 50%, substantially the same operation applies as in the full overlap frontal collision described above.

Oblique Collisions and Small Overlap Collisions

When the ECU 60 has detected or predicted an oblique collision based on data from the collision sensor 62, the ECU 60 actuates the inflators 22A, 32, and the retractor 26. The belt 28 of the seatbelt device 24 is thereby forcibly taken up by the retractor 26, and the multidirectional airbag 30 of the multidirectional airbag device 20 is inflated and deployed so as to surround the head H of the seated occupant D. Moreover, the side airbag 22B of the side airbag device 22 is inflated and deployed at the vehicle width direction outside of the seated occupant D. Further explanation follows regarding the case of an oblique collision; however, a protection mode of the seated occupant D by the occupant protection device 10 in a small overlap collision is substantially the same as the protection mode of the seated occupant D by the occupant protection device 10 in an oblique collision.

Nearside Oblique Collisions

In an oblique collision on the vehicle width direction side installed with the vehicle seat 12, as illustrated by the arrow X in FIG. 3A, the seated occupant D moves toward the vehicle width direction outside, this being the vehicle width direction side of the collision to the vehicle body, while also moving toward the front. Again, in this case, movement of the seated occupant D wearing the three-point type seatbelt device 24 has a mode that tilts forward about the waist P.

In this case, movement of the seated occupant D toward an oblique front collision side (front pillar side) is limited by the side airbag 22B, as well as the front deployment section 36, the delayed deployment section 50, and the lateral deployment section 38 on the vehicle width direction outside configuring the multidirectional airbag 30. Namely, the upper body and head H of the seated occupant D are restrained and protected in an oblique collision by the side airbag 22B, as well as the front deployment section 36, the delayed deployment section 50, and the lateral deployment section 38 on the vehicle width direction outside configuring the multidirectional airbag 30.

This enables movement of the head H toward the oblique front collision side to be limited. Moreover, the front deployment section 36, the delayed deployment section 50, as well as the lateral deployment section 38 on the vehicle width direction outside respectively include the front inflating portion 40, the delayed inflating portion 51, and the lateral inflating portion 44. Accordingly, deformation of at least one inflating portion, this being either the front inflating portion 40 and the delayed inflating portion 51, or the lateral inflating portion 44, functions to absorb energy during the restraint process of the head H and the like. For example, the peak load input to the head H can accordingly be kept small, even when the head H moves as far as the front pillar.

Far-Side Oblique Collisions

In an oblique collision on the vehicle width direction opposite side to the side installed with the vehicle seat 12, as illustrated by the arrow Y in FIG. 3A, the seated occupant D moves toward the vehicle width direction central side, this being the vehicle width direction side of the collision to the vehicle body, while also moving toward the front. Again, in this case, movement of the seated occupant D wearing the three-point type seatbelt device 24 has a mode that tilts forward about the waist P.

In this case, movement of the seated occupant D toward an oblique front collision side (center cluster side) is limited by the front deployment section 36, the delayed deployment section 50, as well as the lateral deployment section 38 on the vehicle width direction central side configuring the multidirectional airbag 30. Namely, the head H of the seated occupant D is restrained and protected in the oblique collision by the front deployment section 36, the delayed deployment section 50, as well as the lateral deployment section 38 on the vehicle width direction central side.

This enables movement of the head H toward the oblique front collision side to be limited. Moreover, the front deployment section 36, the delayed deployment section 50, as well as the lateral deployment section 38 on the vehicle width direction central side respectively include the front inflating portion 40, the delayed inflating portion 51, and the lateral inflating portion 44. Accordingly, deformation of at least one inflating portion, this being either the front inflating portion 40 and the delayed inflating portion 51, or the lateral inflating portion 44, functions to absorb energy during the restraint process of the head H and the like. For example, the peak load input to the head H can thereby be kept small, even when the head H moves as far as a vehicle compartment interior configuration component such as the instrument panel or the center cluster.

Summary of Protection Operation in Collisions

As explained above, in the occupant protection device 10 according to the first exemplary embodiment, the multidirectional airbag 30 housed in the headrest 18 can be inflated and deployed to effectively protect the seated occupant D in side-on collisions and various modes of frontal collision including oblique collisions (collisions from plural directions). The multidirectional airbag 30 is configured as an integral bag body that deploys such that the front deployment section 36 and the lateral deployment sections 38 surround the head H together with the upper deployment section 48 and so on. Accordingly, in the multidirectional airbag 30, the respective deployment sections are firmly linked to each other, and load (reaction force) when restraining the head H, chest B, and shoulders S is supported by the vehicle seat 12. Accordingly, the multidirectional airbag 30 enables the occupant to be restrained with a greater restraining force than in configurations in which plural airbags (inflating portions) are joined together when restraining the occupant.

In the occupant protection device 10, the multidirectional airbag 30 is housed inside the headrest 18 (the module case 34 provided at the rear of the headrest main body 19). Accordingly, the occupant protection device 10 has a more pleasing appearance prior to actuation, while securing equivalent or superior occupant protection performance compared to, for example, a configuration in which gas supply pipes disposed so as to surround the head of the occupant from above are always projecting out inside the vehicle compartment. Moreover, the occupant protection device 10 (in particular the multidirectional airbag device 20) does not hinder front-rear positional adjustment, height adjustment, reclining operation, or the like, of the vehicle seat 12.

In the occupant protection device 10, in their non-restraining inflated and deployed states, the multidirectional airbag 30 and the side airbag 22B are not superimposed on each other, as viewed from the side. Accordingly, in collision modes in which both the multidirectional airbag 30 and the side airbag 22B are inflated and deployed, the multidirectional airbag 30 and the side airbag 22B inflate and deploy appropriately, without impinging on the inflation and deployment of each other. This thereby enables the head H of the seated occupant D to be restrained by the multidirectional airbag 30, and enables the seated occupant D to be restrained by the side airbag 22B from the side over a range from the shoulders S to the waist P.

Specific Contribution of Inflated and Deployed Shape of Delayed Inflating Portion 51 According to First Exemplary Embodiment to Occupant Restraint Performance The delayed inflating portion 51 is configured including the left and right up-down inflating portions 51A that are inflated and deployed adjacent to each other in the seat width direction. Thus, the head H that is moving forward is contacted from both the left and right sides by the up-down inflating portions 51A, and is restrained in a stable posture. In particular, in cases in which the head H moves obliquely forward and contacts a single inflating portion (of a comparative mode) in an oblique collision or a small overlap collision, the head H is liable to rotate about an axis in the up-down direction passing through this contact location. In contrast thereto, in the delayed inflating portion 51, the left and right up-down inflating portions 51A contact the head H from both the left and right sides, such that rotation of the head H is suppressed.

As viewed from the rear, the up-down inflating portions 51A of the delayed inflating portion 51 are inflated and deployed so as to intersect the upper inflating portion 40U, the central inflating portion 40C, and the lower inflating portion 40L of the front inflating portion 40 that have their length along the seat width direction. Thus, the up-down inflating portions 51A that bear load from the head H are firmly supported by the upper inflating portion 40U and the central inflating portion 40C. This enables the head H to be effectively restrained by the small capacity multidirectional airbag 30, compared to comparative modes in which the delayed inflating portion 51 is configured as a single inflating portion, or in which a delayed inflating portion is configured by plural inflating portions that have their length in the same direction as plural arrayed and partitioned inflating portions configuring the front inflating portion.

Since the delayed inflating portion 51 is receives gas supplied through the communicating paths 51R from the lower inflating portion 40L, this beings a lower portion of the front inflating portion 40 in the inflated and deployed state, the delayed inflating portion 51 is inflated and deployed from a lower portion toward an upper portion thereof. This enables the head H of the seated occupant D, whose upper body has tilted forward when being restrained by the lap belt 28L of the seatbelt device 24 in a frontal collision, an oblique collision, or a small overlap collision, to be effectively restrained from below. Moreover, the delayed inflating portion 51 is in communication with a lower end of the lower inflating portion 40L in the inflated and deployed state, thereby enabling the lower inflating portion 40L to be inflated and deployed prior to inflation and deployment of the delayed inflating portion. This enables the shoulders S and chest B of the seated occupant D to be restrained in an initial stage of the collision by the lower inflating portion 40L, thereby contributing to suppressing load acting on the head H.

The delayed inflating portion 51 is also configured including the upper body restraint portion 51B. This enables the delayed inflating portion 51 to be inflated and deployed closer to the upper body of the seated occupant D prior to the seated occupant D starting to move toward the front than in a comparative mode in which the chest B and shoulders S are only restrained by the lower inflating portion 40L of the front inflating portion 40. Thus, when movement of the seated occupant D toward the front due to the collision is restricted (when energy is absorbed), the burden of load on the chest B and shoulders S of the seated occupant D increases, such that load acting on the head H is reduced.

Other Operation and Advantageous Effects

Improvement in Restraint Performance by Appropriate Inflation and Deployment

In the multidirectional airbag device 20 configuring the occupant protection device 10, the lower ends 44L of the lateral inflating portions 44 configuring the lateral deployment sections 38 of the multidirectional airbag 30 contact the shoulders S of the seated occupant D, thereby positioning the multidirectional airbag 30 in the up-down direction with respect to the seated occupant D. For example, this thereby enables the multidirectional airbag 30 to be inflated and deployed at an appropriate position in the up-down direction, irrespective of individual differences in the physical frame or seated posture, within an appropriate range, of the seated occupant D. The restraint performance (movement limiting performance) of the seated occupant D by the multidirectional airbag 30 is thereby improved.

Securing Inflation and Deployment Performance Using the Multidirectional Airbag Itself The multidirectional airbag 30 is housed inside the headrest 18 in a state rolled up outward. The rolled-up portion 30R, this being a portion of the multidirectional airbag 30 that unravels during the inflation and deployment process, is thereby positioned above the frame ducts 35. The multidirectional airbag 30 is accordingly easier to deploy in a mode passing above the head H of the seated occupant D while deploying toward the front accompanying the flow of gas into the frame ducts 35 than in a configuration in which an unraveling portion is at a lower position, namely, positioned at the side of the head H of the seated occupant D.

In particular, in the multidirectional airbag 30, the front inflating portion 40 is connected to the respective front ducts 35F of the pair of frame ducts 35. Thus, the front inflating portion 40 (front deployment section 36) is inflated after being deployed up and down accompanying inflation and deployment of the front ducts 35F, and so is less liable to impinge on the head H in the inflation and deployment process. In the multidirectional airbag 30, each lateral inflating portion 44 is connected to the respective front duct 35F and upper duct 35U of the corresponding frame duct 35. Thus, the lateral inflating portions 44 (lateral deployment sections 38) are inflated after being deployed accompanying inflation and deployment of the front ducts 35F, and so are less liable to impinge on the head H in the inflation and deployment process.

The multidirectional airbag 30 also includes the cross inflating portions 48A that couple together the upper ducts 35U of the pair of frame ducts 35 that are inflated and deployed separated from each other in the seat width direction. Namely, a continuous, integral inflating portion, configured of the cross inflating portions 48A together with the pair of the upper ducts 35U of the multidirectional airbag 30, is formed above the head H, such that the multidirectional airbag 30 configured as an integral bag body is stably and easily inflated and deployed.

Securing Inflation and Deployment Performance of the Multidirectional Airbag Using the Deployment Guide Cloth The multidirectional airbag device 20 configuring the occupant protection device 10 also includes the deployment guide cloth 58 with the face at the side contacting the multidirectional airbag 30 configured as a low friction face. The deployment guide cloth 58 is deployed along the vehicle compartment ceiling of the automobile in advance of the multidirectional airbag 30 accompanying inflation and deployment of the multidirectional airbag 30. The deployment guide cloth 58 has lower friction with respect to the multidirectional airbag 30 than the vehicle compartment ceiling material, thereby enabling the multidirectional airbag 30 to be inflated and deployed more smoothly than in configurations in which the deployment guide cloth 58 is not included.

Thus, the multidirectional airbag 30 is suppressed by the deployment guide cloth 58 from catching on the vehicle compartment ceiling, a member provided to the ceiling, or the like, in the inflation and deployment process. In other words, the multidirectional airbag 30 can be smoothly inflated and deployed, while utilizing the vehicle compartment ceiling as a guide (a limiter that limits upward movement) to inflate and deploy the multidirectional airbag 30 toward the front.

Securing Inflation and Deployment Performance of the Multidirectional Airbag Using the Module Case In the multidirectional airbag device 20 configuring the occupant protection device 10, the module case 34 juts out upward and to both vehicle width direction sides of the headrest body 19. The multidirectional airbag 30 can accordingly be deployed toward the front from the portions of the module case 34 that jut out in the seat width direction with respect to the headrest body 19 (gap portions between the module case 34 and the headrest body 19), as viewed from the front. This thereby enables inflation and deployment of the multidirectional airbag 30 to be completed in a shorter time than in a configuration including a multidirectional airbag that is deployed toward the front from only an upper portion of the headrest body 19.

The multidirectional airbag 30 is housed between the headrest main body 19 and the module case 34 at the rear of the headrest main body 19, and the main wall 34M of the module case 34 supports the multidirectional airbag 30 from the rear during the inflation and deployment process. Reaction force of the multidirectional airbag 30 is thereby supported from the rear by the main wall 34M accompanying inflation and deployment, and the multidirectional airbag 30 is inflated and deployed toward the front without moving toward the rear. This thereby enables a more appropriate inflation and deployment mode (position, shape) of the multidirectional airbag 30 than in a configuration in which a main wall of the module case 34 does not include a support wall (function).

Moreover, the main wall 34M of the module case 34 configures a curved shape protruding upward and rearward as viewed from the side, such that the upper end of the main wall 34M is positioned further forward than the lower end. Accordingly, while the multidirectional airbag 30, in a folded state at the rear of the headrest main body 19, heads upward inside the module case 34 during an initial stage of inflation and deployment, the multidirectional airbag 30 is guided upward and toward the front by the main wall 34M during deployment to outside the module case 34. Namely, during the inflation and deployment process, the multidirectional airbag 30 is guided upward and toward the front by the main wall 34M of the module case 34 so as to be deployed toward the front while passing above the head H of the seated occupant D. This thereby enables a more appropriate inflation and deployment mode (path) of the multidirectional airbag 30 than in configurations in which the main wall 34M does not include a guide wall (function).

Other Advantageous Effects of Module Case and the Like

In the multidirectional airbag device 20 configuring the occupant protection device 10, the module case 34 that houses the multidirectional airbag 30 and the inflator 32 is disposed at the rear of the headrest main body 19. Thus, the structure of the vehicle seat 12 is less liable to be restrictive than, for example, configurations in which the multidirectional airbag 30 and the inflator 32 are housed inside the seatback 16. In other words, the multidirectional airbag device 20 can be provided to the vehicle seat 12 without greatly changing the structure of the vehicle seat 12.

The multidirectional airbag 30 in the folded state is disposed at the rear of the upper portions 19SU and the intermediate portions 19SC of the headrest stays 19S. This enables the multidirectional airbag 30 to be disposed in a wider space at the rear of the headrest stays 19S formed in crank shapes than, for example, configurations in which the multidirectional airbag 30 is disposed at the rear of headrest stays 19S formed in straight shapes along the up-down direction. This enables the multidirectional airbag 30 to be housed inside the headrest 18, while compactly configuring the entire headrest 18 including the module case 34. Moreover, the multidirectional airbag 30 in the folded state is disposed close to the head H of the seated occupant D, thereby enabling the multidirectional airbag 30 to be inflated and deployed in a form surrounding the head H of the seated occupant D in a short time.

Other Exemplary Embodiments

Explanation follows regarding other exemplary embodiments. Note that configuration or operation that is basically the same as in the first exemplary embodiment or a previous exemplary embodiment is appended with the same reference numeral as in the first exemplary embodiment or the previous exemplary embodiment, and explanation or illustration thereof is sometimes omitted.

Second Exemplary Embodiment

Figure 7:
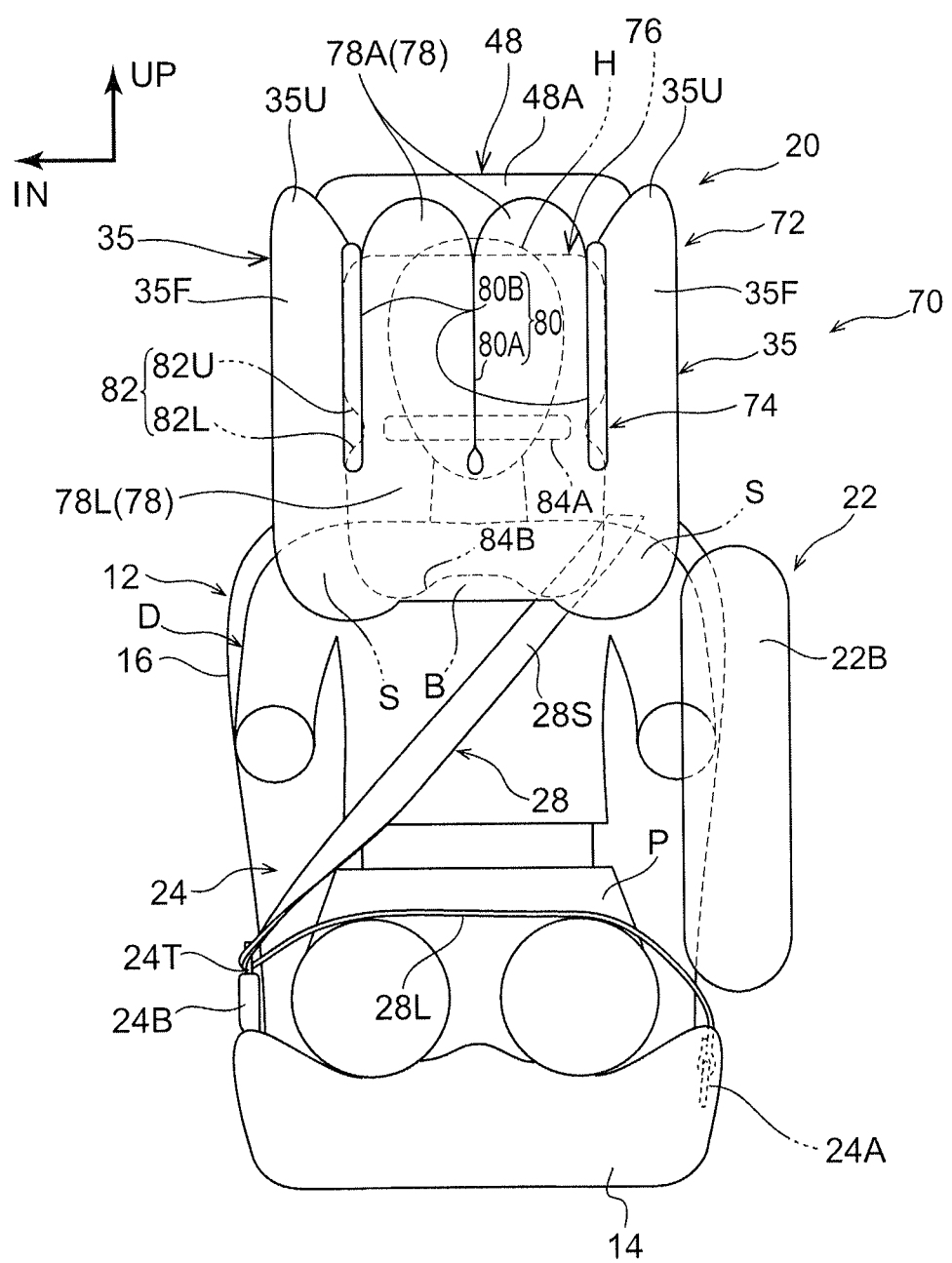
FIG. 7 is a face-on view schematically illustrating a protection mode of a seated occupant by an occupant protection device according to a second exemplary embodiment of the present invention.
Figure 8:
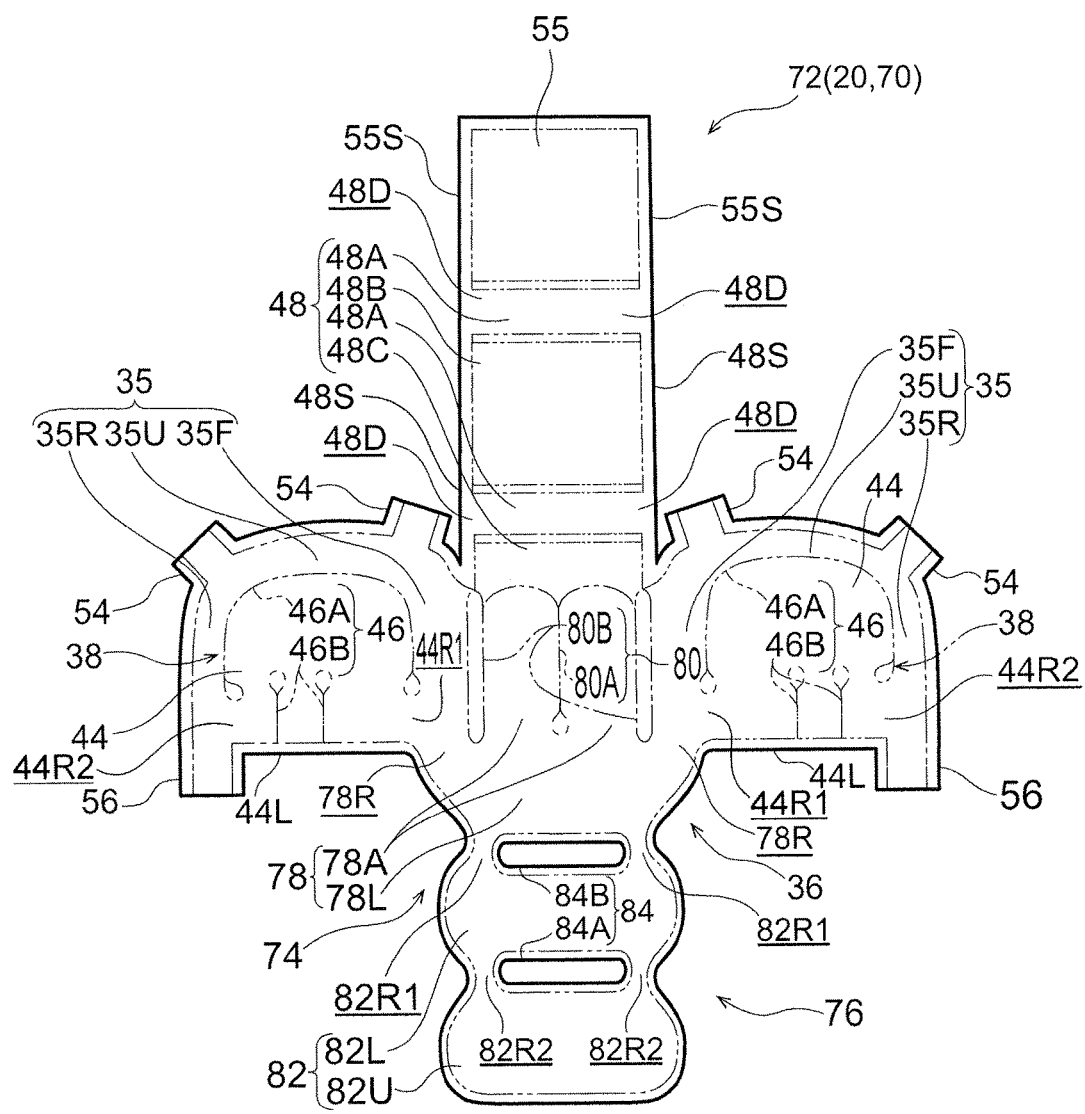
FIG. 8 is a diagram illustrating a flat pattern of a multidirectional airbag configuring an occupant protection device according to the second exemplary embodiment of the present invention.

Explanation follows regarding an occupant protection device 70 according to a second exemplary embodiment, based on FIGS. 7 and 8. FIG. 7 illustrates the occupant protection device 70 according to the second exemplary embodiment in a face-on view corresponding to FIG. 2. As illustrated in FIG. 7, a multidirectional airbag device 20 of the occupant protection device 70 is configured including a multidirectional airbag 72 instead of the multidirectional airbag 30. Configuration of a front deployment section 74 and a delayed deployment section 76 of the multidirectional airbag 72 is different from the configuration of the front deployment section 36 and the delayed deployment section 50 of the multidirectional airbag 30.

Front Deployment Section

The front deployment section 74 is configured including a front inflating portion 78 that deploys in front of the head H, and a non-inflating portion 80 that partitions the front inflating portion 78 into plural inflating portions. In the present exemplary embodiment, the front inflating portion 78 is configured including a pair of up-down inflating portions 78A that are inflated and deployed adjacent to each other in the seat width direction with their length direction along the up-down direction, and a lower inflating portion 78L positioned below the pair of up-down inflating portions 78A. The pair of up-down inflating portions 78A are configured so as to inflate and deploy in front of the head H, and the lower inflating portion 78L is configured so as to inflate and deploy in front of the chest B and shoulders S of the seated occupant D.

The non-inflating portion 80 is configured including a non-inflating portion 80A that partitions the pair of up-down inflating portions 78A in the seat width direction, and non-inflating portions 80B that are respectively interposed between the up-down inflating portions 78A and the front ducts 35F of the frame ducts 35. In the present exemplary embodiment, the non-inflating portion 80A is configured by a line shaped seam extending up and down, and each non-inflating portion 80B is configured as a portion surrounded by a ring (endless) shaped seam extending up and down. Both length direction ends of the lower inflating portion 78L of the front inflating portion 78 are in communication with lower portions of the front ducts 35F through communicating paths 78R (see FIG. 8). Lower ends of the pair of up-down inflating portions 78A are in communication with the lower inflating portion 78L.

Delayed Inflating Portion

The delayed deployment section 76 is configured including a delayed inflating portion 82 that is deployed at a portion of the head H including the front, and a non-inflating portion 84 that partitions the delayed inflating portion 82 into plural inflating portions. In the present exemplary embodiment, the delayed inflating portion 82 is configured such that an upper inflating portion 82U and a lower inflating portion 82L, serving as width direction inflating portions that are each inflated and deployed with their length direction along the seat width direction, are inflated and deployed alongside each other in sequence from above. Namely, the delayed inflating portion 82 is configured including the upper inflating portion 82U and the lower inflating portion 82L as relevant portions. Configuration is such that the upper inflating portion 82U is inflated and deployed in front of a portion of the head H excluding a lower portion thereof, and the lower inflating portion 82L is inflated and deployed in front of a portion from the lower portion of the head H to the chest B and shoulders S of the seated occupant D. Namely, a lower portion of the lower inflating portion 82L corresponds to an upper body restraint portion.

The non-inflating portion 84 is configured including a non-inflating portion 84A that partitions the upper inflating portion 82U and the lower inflating portion 82L, and a non-inflating portion 84B that partitions the lower inflating portion 82L and the lower inflating portion 78L of the front inflating portion 78. In the present exemplary embodiment, the non-inflating portions 84A, 84B are each configured by a portion surrounded by a ring shaped seam extending along the seat width direction.

The delayed deployment section 76 is inflated and deployed due to the lower inflating portion 82L receiving gas supplied from the inflated and deployed front inflating portion 40 (the lower inflating portion 78L in the present exemplary embodiment) through communicating paths 82R1, serving as a gas supply section. The communicating paths 82R1 form gas through-paths that place a lower portion (lower end portion) of the lower inflating portion 78L in an inflated and deployed state and the lower portion (lower end portion) of the lower inflating portion 82L in communication with each other. In the present exemplary embodiment, one of each communicating path 82R1 is disposed at either seat width direction side of the non-inflating portion 84B, namely, at either end portion in the seat width direction of a boundary between the lower inflating portion 82L and the lower inflating portion 78L.

Note that the upper inflating portion 82U is inflated and deployed on receiving gas supplied from the lower inflating portion 82L through communicating paths 82R2. In the present exemplary embodiment, one of each communicating path 82R2 is disposed at either seat width direction side of the non-inflating portion 84A, namely, at either end portion in the seat width direction of a boundary between the lower inflating portion 82L and the upper inflating portion 82U.

Flat Pattern

Explanation follows regarding gas supply paths to respective portions of the multidirectional airbag 72, mainly regarding portions that differ from the multidirectional airbag 30, with reference to the flat pattern illustrated in FIG. 8. Prior to parts of peripheral edges being stitched together and prior to folding, the multidirectional airbag 72 has an opened-out shape (flat pattern) such as that illustrated in FIG. 8.

As described above, the delayed deployment section 76 is configured such that gas is supplied from the lower inflating portion 78L through the communicating paths 82R1. The delayed deployment section 76 is folded back at a location where the communicating paths 78R are formed and superimposed on the front deployment section 74. The communicating paths 78R are closed off until the internal pressure of the front inflating portion 78 reaches a specific internal pressure, such that almost no gas is supplied (flows) into the delayed inflating portion 82. Note that the folded-back and superimposed delayed deployment section 76 may be joined to the front inflating portion 78 by stitching or the like.

Operation and Advantageous Effects

Explanation follows regarding operation of the second exemplary embodiment, mainly regarding operation that differs from in the first exemplary embodiment.

The occupant protection device 70 according to the second exemplary embodiment exhibits similar advantageous effects by similar operation to the occupant protection device 10, excluding the advantageous effect of suppressing rotation of the head H in cases of an oblique collision or a small overlap collision due to the pair of up-down inflating portions 51A of the delayed inflating portion being inflated and deployed adjacent to each other in the seat width direction.

Supplementary explanation follows below regarding operation and advantageous effects due to the front inflating portion 78 and the delayed inflating portion 82 being inflated and deployed so as to intersect each other as viewed from the rear. The upper inflating portion 82U and (an upper portion of) the lower inflating portion 82L of the delayed inflating portion 82 are inflated and deployed so as to intersect the pair of up-down inflating portions 78A of the front inflating portion 78 from the rear. Thus, the upper inflating portion 82U and the lower inflating portion 82L that bear load from the head H are firmly supported by the pair of up-down inflating portions 78A. This enables the head H to be more effectively restrained by the small capacity multidirectional airbag 72 than in comparative modes configured such that the front inflating portion is a single inflating portion, or such that the front inflating portion and the delayed inflating portion are configured by plural inflating portions with their length in the same direction.

Third Exemplary Embodiment

Figure 9:
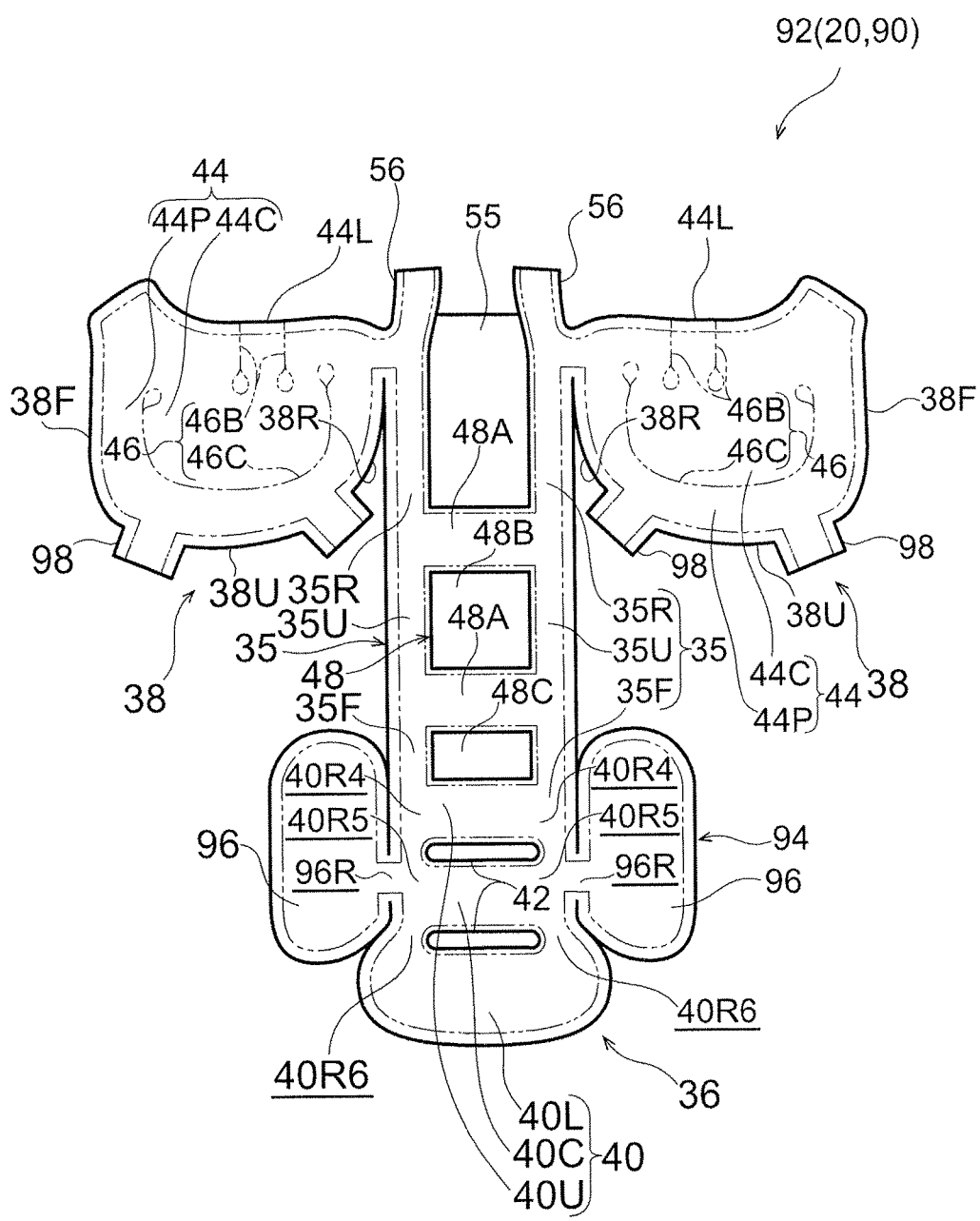
FIG. 9 is a diagram illustrating a flat pattern of a multi-directional airbag configuring an occupant protection device according to a third exemplary embodiment of the present invention.

Explanation follows regarding an occupant protection device 90 according to a third exemplary embodiment, based on FIG. 9. FIG. 9 illustrates a flat pattern of a multidirectional airbag 92 configuring the occupant protection device 90 according to the third exemplary embodiment. As illustrated in FIG. 9, the flat pattern of the multidirectional airbag 92 differs from that of the multidirectional airbag 30 of the first exemplary embodiment. Note that, although not illustrated in the drawings, an inflation and deployment mode of the multidirectional airbag 92 is substantially the same as the inflation and deployment mode of the multidirectional airbag 30.

In the flat pattern of the multidirectional airbag 92, the frame ducts 35 extend in substantially a straight line along the front deployment section 36, the upper deployment section 48 and the rear deployment section 55, from the supply tubes 56 as far as the lower inflating portion 40L (communicating paths 40R6, described later) of the front inflating portion 40. From the state illustrated in FIG. 9, the frame ducts 35 are joined to respective rear edges 38R, upper edges 38U, and front edges 38F of the lateral deployment sections 38 by stitching or the like.

Communicating tubes 98, each with one end in communication with the respective lateral inflating portions 44, project out from the upper portions of the lateral inflating portions 44. Another end of each communicating tube 98 is joined to the respective upper duct 35U of the frame duct 35 in a communicating state. In the present exemplary embodiment, two communicating tubes 98 that are separated from each other at the front and rear are provided to each lateral inflating portion 44. Note that a U-shaped seam 46C, shaped similarly to the U-shaped seam 46A of the first exemplary embodiment, is provided on each lateral deployment section 38. The U-shaped seam 46C partitions the respective lateral inflating portion 44 into a central inflating portion 44C and a peripheral edge inflating portion 44P. Thus, in the lateral inflating portions 44, the peripheral edge inflating portions 44P that receive gas supplied from the frame ducts 35 through the communicating tubes 98 are inflated and deployed in advance of the central inflating portions 44C.

In the present exemplary embodiment, the upper inflating portion 40U, the central inflating portion 40C, and the lower inflating portion 40L of the front inflating portion 40 of the front deployment section 36 are respectively placed in communication with the front ducts 35F through communicating paths 40R4, 40R5, and 40R6. The non-inflating portion 42 that divides the upper inflating portion 40U, the central inflating portion 40C, and the lower inflating portion 40L is configured without end seams 42E. Namely, the upper inflating portion 40U and the central inflating portion 40C of the present exemplary embodiment may be considered to be configured as an continuous, integral inflating portion, configured of the front ducts 35F together with the lower inflating portion 40L, coupling together the front ducts 35F at both seat width direction sides. In the present exemplary embodiment, the non-inflating portion 42 is configured as a pair of ring shaped seams that extend along the seat width direction with an up-down direction separation therebetween.

The multidirectional airbag 92 includes a delayed deployment section 94 instead of the delayed deployment section 50. The delayed deployment section 94 is configured with a pair of delayed inflating portions 96 as relevant portions. The delayed inflating portions 96 are joined to the respective front ducts 35F of the frame ducts 35, and are in communication with length (up-down in a deployed state) direction center portions of the front ducts 35F through communicating paths 96R. Namely, the delayed inflating portions 96 differ from the delayed inflating portion 51, which receives gas supplied from the front inflating portion 40, in that the delayed inflating portions 96 receive gas supplied from the front ducts 35F.

Although not illustrated in the drawings, each delayed inflating portion 96 is folded back at a back side (the rear side in an inflated and deployed state) of the front deployment section 36, and joined thereto by stitching or the like. The joint portions may be considered to be non-inflating portions of the delayed deployment section. The delayed inflating portions 96 that receive gas supplied through the communicating paths 96R formed at the folded-back portions are configured so as to be supplied with gas after the front ducts 35F and the front inflating portion 40, configured as an integral inflating portion as described above, have been inflated and deployed.

Operation and Advantageous Effects

Explanation follows regarding operation of the third exemplary embodiment, mainly with respect to operation that differs from the operation of the first exemplary embodiment.

In the occupant protection device 90 according to the third exemplary embodiment, the front inflating portion 40 is inflated and deployed accompanying inflation and deployment of the front ducts 35F of the frame ducts 35. Gas is supplied to the delayed inflating portions 96 through the communicating paths 96R from the front ducts 35F that has inflated and deployed accompanying the front inflating portion 40 in this manner. Thus, the delayed inflating portions 96 are inflated and deployed after the front inflating portion 40 has inflated and deployed.

Thus, in the occupant protection device 90 according to the third exemplary embodiment, as described above, the multidirectional airbag 92 is inflated and deployed in a similar shape to the multidirectional airbag 30 in a similar inflation and deployment sequence to the multidirectional airbag 30. Thus, the occupant protection device 90 exhibits similar advantageous effects due to having basically the same operation as the occupant protection device 10.

In the occupant protection device 90, the central inflating portion 44C, which has the thickest inflation and deployment thickness in the seat width direction, is the lateral inflating portion 44 that is inflated and deployed with the greatest delay. Thus, the lateral inflating portions 44 are effectively suppressed from impinging on the head H in the inflation and deployment process.

Fourth Exemplary Embodiment

Explanation follows regarding an occupant protection device 100 according to a fourth exemplary embodiment, based on FIGS. 10A to 10C and FIGS. 11A to 11F. FIG. 10A illustrates part of a flat pattern of a multidirectional airbag 102 configuring the occupant protection device 100 according to the fourth exemplary embodiment. As illustrated in FIG. 10A, the multidirectional airbag 102 differs from the first exemplary embodiment in that it is configured including a delayed deployment section 104 instead of the delayed deployment section 50.

The delayed deployment section 104 is configured with a delayed inflating portion 106 as a relevant portion. The delayed inflating portion 106 is formed (disposed) superimposed on the front inflating portion 40 in the thickness direction. Specifically, as illustrated in FIGS. 10B and 10C, the delayed inflating portion 106 is configured with a base cloth 108, forming a rear wall of the front inflating portion 40, as a front wall. In other words, the delayed inflating portion 106 and the front inflating portion 40 are partitioned by a common base cloth 108. The delayed inflating portion 106 is supplied with gas from the front inflating portion 40 through communicating holes 110 formed in the base cloth 108. Specific explanation follows below.

FIG. 10B is an enlarged cross-section schematically illustrating an inflated and deployed state of a location taken along line 10B-10B in FIG. 10A. FIG. 10C is an enlarged cross-section schematically illustrating an inflated and deployed state of a location taken along line 10C-10C in FIG. 10A. As illustrated in FIG. 10A, in the flat pattern of the multidirectional airbag 102, a lower portion of the delayed inflating portion 106 juts out further downward than a lower portion of the front inflating portion 40. On receiving gas supplied from the communicating holes 110, a portion of the delayed inflating portion 106 that juts out below the lower portion of the front inflating portion 40 is raised up and inflated and deployed at the rear side of the front inflating portion 40. The portion of the delayed inflating portion 106 that is inflated and deployed at the rear of the lower inflating portion 40L corresponds to an upper body restraint portion that is inflated and deployed in front of both the shoulders S and chest B of the seated occupant D.

In the present exemplary embodiment, two communicating holes 110 are formed in a portion of the base cloth 108 configuring the lower inflating portion 40L, with a separation in the seat width direction therebetween. Configuration is such that, when the outward rolling of the front inflating portion 40 is unraveled and the lower inflating portion 40L of the front inflating portion 40 is inflated and deployed in the multidirectional airbag 102, gas is supplied to the delayed inflating portion 106 from the lower inflating portion 40L through the communicating holes 110. Namely, the delayed inflating portion 106 is inflated and deployed later than the front inflating portion 40. The hole diameter (and number) of the communicating holes 110 in the multidirectional airbag 102 is determined such that inflation and deployment of the delayed inflating portion 106 is completed at a specific timing.

Explanation follows regarding a manufacturing method of the delayed inflating portion 106, based on FIGS. 11A to 11F. FIGS. 11A to 11C are cross-sections schematically illustrating a manufacturing process of a location taken along line 10B-10B in FIG. 10A. FIGS. 11D to 11F are cross-sections schematically illustrating a manufacturing process of a location taken along line 10C-10C in FIG. 10A. In the below explanation, a base cloth that forms the front inflating portion 40 together with the base cloth 108 is referred to as a base cloth 112, and a base cloth that forms the delayed inflating portion 106 together with the base cloth 108 is referred to as a base cloth 114.

First, as illustrated in FIGS. 11A and 11D, the base cloth 108 and the base cloth 114 are joined (stitched) together at a seam S1. The base cloth 114 is joined at the seam S1 to a portion of the base cloth 108 forming a rear wall of the upper inflating portion 40U. Note that the seam S1 may be combined with a seam S3 (such as the seam S3 that is positioned furthest upward), described later, at the location taken along line 10C-10C in FIG. 10A.

Next, as illustrated in FIGS. 11B and 11E, the base cloth 108 and the base cloth 112 are joined (stitched) together at a seam S2. A lower end of the base cloth 112 is joined at the seam S2 to a portion of the base cloth 108 that is further toward the lower side than the communicating holes 110. The base cloth 108 and the base cloth 112 are also joined (stitched) together at the seams S3 that form the non-inflating portion 42. The base cloth 114 is turned up when joining at the seams S2, S3, such that the base cloth 114 does not become joined to the base cloth 108 and so on at the seams S2, S3.

Next, as illustrated in FIGS. 11C and 11F, the base cloth 108 and the base cloth 114 are joined (stitched) together at the seam S4. A lower end of the base cloth 114 is joined at the seam S4 to a portion of the base cloth 108 that is further toward the lower side than a joint location at the seam S2. Although not illustrated in the drawings, the front inflating portion 40 and the delayed inflating portion 106 in the mode described above are configured by respectively joining the base cloth 108 and the base cloth 112, and the base cloth 108 and the base cloth 114, together at seams at portions forming side ends of the front inflating portion 40 and the delayed inflating portion 106.

Operation and Advantageous Effects

Explanation follows regarding operation of the fourth exemplary embodiment, mainly with respect to operation that differs from the operation of the first exemplary embodiment.

The occupant protection device 100 according to the fourth exemplary embodiment exhibits similar advantageous effects by similar operation to the first exemplary embodiment, excluding the advantageous effects of the pair of up-down inflating portions 51A of the delayed inflating portion 51 being inflated and deployed adjacent to each other in the seat width direction, and of the delayed inflating portion 51 being inflated and deployed so as to intersect the upper inflating portion 40U of the front inflating portion 40 and so on as viewed from the rear.

In the occupant protection device 100, gas is supplied to the delayed inflating portion 106 from the front inflating portion 40 through the communicating holes 110 that pierce through the base cloth 108 as described above. This configuration enables the flow rate of gas supplied to the delayed inflating portion 106 from the front inflating portion 40, namely, the deployment completion timing of the delayed inflating portion 106, to be adjusted (set) according to the diameter (and number) of the communicating holes 110. Thus, the occupant protection device 100 enables the deployment completion timing of the delayed inflating portion 106 to be adjusted using a simpler configuration than in a comparative mode in which a gas supply section that supplies gas from the front inflating portion 40 to the delayed inflating portion 106 has a duct-shaped three dimensional structure.

In the fourth exemplary embodiment, an example has been given in which the delayed inflating portion 106 receives gas supplied from the lower inflating portion 40L through the communicating holes 110; however, the present invention is not limited thereto. For example, a configuration may be applied in which the delayed inflating portion 106 receives gas supplied from the upper inflating portion 40U, the central inflating portion 40C, or the like through the communicating holes 110. Namely, the delayed inflating portion 106 is not limited to a configuration including an inflating portion corresponding to an upper body restraint portion.

Other Modified Examples

In each of the above exemplary embodiments, an example has been given in which the occupant protection device 10, 70, 90, 100 includes the side airbag device 22; however, the present invention is not limited thereto. For example, a configuration may be applied in which the occupant protection device 10 or the like does not include the side airbag device 22. Moreover, in configurations in which the occupant protection device 10 or the like does include a side airbag device, there is no limitation to a configuration in which the side airbag device is provided to the vehicle seat 12. For example, the occupant protection device 10 or the like may be configured including a side airbag device provided in a side door or the like. Moreover, in each of the above exemplary embodiments, an example has been given in which the occupant protection device 10 or the like includes the side airbag device 22 on the vehicle width direction outside; however, the present invention is not limited thereto. For example, configuration may be made in which the occupant protection device 10 or the like includes a side airbag device disposed on the vehicle width direction central side instead of, or in addition to, the side airbag device 22 on the vehicle width direction outside.

In each of the above exemplary embodiments, an example has been given in which the occupant protection device 10, 70, 90, 100 includes the seatbelt device 24; however, the present invention is not limited thereto. For example, a configuration may be applied in which the occupant protection device 10 or the like does not include the seatbelt device 24. Moreover, in configurations in which the occupant protection device 10 or the like does include a seatbelt device, there is no limitation to a configuration in which the seatbelt device is provided to the vehicle seat 12. For example, configuration may be made in which the retractor, the anchor, the buckle, and the like are provided on the vehicle body side. Moreover, in configurations in which the occupant protection device 10 or the like does include the seatbelt device, there is no limitation to a three-point type seatbelt device, and a four-point type or a two-point type seatbelt device may be employed.

In each of the above exemplary embodiments, an example has been given in which the seat width direction of the vehicle seat 12 corresponds to the vehicle width direction. However, the present invention is not limited thereto. For example, the vehicle seat 12 may be disposed at an angle with respect to the vehicle body, or a configuration may be applied in which the orientation of the vehicle seat 12 with respect to the vehicle body can be changed (rotated about an up-down axis). In such a configuration, configurations including the multidirectional airbag 30, 72, 92, 102 that is inflated and deployed so as to surround the head H of the seated occupant D can contribute to good protection of the head H. Moreover, since the multidirectional airbag 30 or the like is housed in the headrest 18 prior to being inflated and deployed, the multidirectional airbag 30 is not liable to interfere with surfaces inside the vehicle compartment or vehicle interior configuration components, and is suppressed or prevented from hindering operations to change the orientation of the vehicle seat 12 with respect to the vehicle body.

In the each of the above exemplary embodiments, an example has been given in which the multidirectional airbag device 20 is housed in the headrest 18; however, the present invention is not limited thereto. For example, a multidirectional airbag may be configured housed in the seatback 16, or may be configured housed in an integrated headrest type of seatback, such as a bucket type seat. The multidirectional airbag device 20 may be provided straddling between the seatback 16 and the headrest 18. Namely, the present invention is not limited to being applied to a configuration in which the headrest and the seatback are clearly divided. In configurations in which the seatback 16 includes a back board, for example, configuration may be such that the multidirectional airbag device 20, 70 is housed between the back board and a seatback main body. In configurations in which the multidirectional airbag device 20, 70 is provided inside a headrest, the multidirectional airbag device 20 may, for example, be provided between a cushioning material and a covering material of the headrest as long as the mode allows the headrest function to be realized.

In each of the above exemplary embodiments, an example has been given in which the multidirectional airbag 30, 72, 92, 102 is inflated and deployed between the respective upper portions and both left and right side portions of the module case 34 and the headrest main body 19 as viewed from the front; however, the present invention is not limited thereto. For example, a configuration may be applied in which the multidirectional airbag 30, 74 is only deployed from above the headrest main body 19.

In each of the above exemplary embodiments, an example has be explained in which the multidirectional airbag 30, 72, 92, 102 is configured including the upper deployment section 48 and the delayed deployment section 50; however, the present invention is not limited thereto. It is sufficient as long as the multidirectional airbag is configured including at least a frame duct including an upper duct, a front inflating portion, and left and right inflating portions. Thus, the present invention is not limited to a configuration including the front ducts 35F, and a configuration may be applied in which gas is supplied to the front inflating portion 40 from the front ends of the upper ducts 35U. The frame duct is not limited to a configuration such as the frame ducts 35 in which a left and right pair are provided. For example, a configuration may be applied in which a single inflation and deployment section is inflated and deployed so as to pass above the head H.

In each of the above exemplary embodiments, an example has been given in which the lower inflating portion 40L, 78L of the front inflating portion 40 is inflated and deployed in front of both the shoulders S and chest B of the seated occupant D; however, the present invention is not limited thereto. For example, the lower inflating portion 40L, 78L may be configured so as to be inflated and deployed in front of one of either the shoulders S or the chest B. In each of the above exemplary embodiments, an example has been given in which the upper body restraint portion 51B of the delayed deployment section 50, the lower portion of the lower inflating portion 82L, or the lower portion of the delayed inflating portion 106 is inflated and deployed in front of both the shoulders S and chest B of the seated occupant D; however, the present invention is not limited thereto. For example, a configuration that does not include the upper body restraint portion 51B or the lower inflating portion 82L may be applied, or the upper body restraint portion 51B or the lower inflating portion 82L may be configured so as to be inflated and deployed in front of one of either the shoulders S or the chest B.

In the respective above exemplary embodiments, an example has been given of a configuration in which two up-down inflating portions 51A intersect the upper inflating portion 40U and the central inflating portion 40C, these being two width direction inflating portions, as viewed from the rear, and a configuration in which the upper inflating portion 82U and the lower inflating portion 82L, these being two width direction inflating portions, intersect the two up-down inflating portions 78A as viewed from the rear. However, the present invention is not limited thereto, and the number of plural width direction inflating portions and the number of plural up-down inflating portions that intersect each other as viewed from the rear may each be three or more, and the number of plural width direction inflating portions and the number of plural up-down inflating portions may differ from each other.

In each of the above exemplary embodiments, an example has been given in which the multidirectional airbag 30, 72, 92, 102 is rolled up outward; however, the present invention is not limited thereto. For example, the multidirectional airbag 30, 74 may be housed in the headrest 18 or the like by employing another folding mode, such as concertina folding.

In each of the above exemplary embodiments, an example has been given in which the multidirectional airbag device 20 includes the deployment guide cloth 58; however, the present invention is not limited thereto. For example, a configuration may be applied in which the deployment guide cloth 58 is not included. Alternatively, for example, the ceiling material of the vehicle compartment ceiling may be configured as a low friction material, or low friction treatment may be applied to the vehicle compartment ceiling, instead of a configuration provided with the deployment guide cloth 58.

In the first and second exemplary embodiments, an example has been given in which gas is supplied to the delayed inflating portion 51, 82 from the lower inflating portion 40L, 78L of the front inflating portion 40, 78; however, the present invention is not limited thereto. For example, a configuration may be applied in which the delayed inflating portion 51, 82 receives gas supplied from the upper inflating portion 40U and the central inflating portion 40C of the front inflating portion 40, or the up-down inflating portions 78A of the front inflating portion 78, or the like. Namely, the delayed inflating portion 51, 82 is not limited to a configuration including an inflating portion corresponding to an upper body restraint portion.

Obviously, various modifications may be implemented to the present invention within a range not departing from the spirit thereof. For example configuration (elements) of each of the above exemplary embodiments and modified examples may be combined or exchanged as appropriate.

What is claimed is:

1. An occupant protection device configured as an integral bag body, comprising an airbag that, from a state housed in a headrest or a seatback, is inflated and deployed on being supplied with gas, the airbag including:
   a frame duct that, as viewed from a seat width direction, includes an upper duct that is configured to inflate and deploy at a seat upper side of a head of an occupant with a seat front end of the upper duct configured to reach a seat front side of the head of the occupant in an inflated and deployed state;
   a front inflating portion that is configured to receive gas supplied from a portion of the frame duct in front of the head, and is configured to inflate and deploy at the seat front side of the head of the occupant;
   a pair of lateral inflating portions that are configured to receive gas supplied from the frame duct or the front inflating portion, or both, and that are configured to inflate and deploy at both seat width direction sides of the head of the occupant; and
   a delayed inflating portion that receives gas supplied from the front inflating portion in a state of being inflated and deployed, the delayed inflating portion configured to inflate and deploy at the seat front side of the head or at a portion of the frame duct configured to inflate and deploy in front of the head, or both, the delayed inflating portion is configured to inflate and deploy after inflation and deployment of the front inflating portion.

2. The occupant protection device of claim 1, wherein the delayed inflating portion includes a pair of up-down inflating portions, each of the up-down inflating portions having a length direction along an up-down direction and being inflated and deployed adjacent to each other in the seat width direction.

3. The occupant protection device of claim 1, wherein:
   the front inflating portion includes a plurality of width direction inflating portions that are inflated and deployed alongside each other in an up-down direction with a length direction along the seat width direction; and the delayed inflating portion includes a plurality of up-down inflating portions, each of the up-down inflating portions having a length direction along the up-down direction and being inflated and deployed alongside each other in the seat width direction and intersecting the width direction inflating portions as viewed from a seat rear side.

4. The occupant protection device of claim 1, wherein:

the front inflating portion includes a plurality of up-down inflating portions, each of the up-down inflating portions having a length direction along an up-down direction and being inflated and deployed alongside each other in the seat width direction; and the delayed inflating portion includes width direction inflating portions, each of the width direction inflating portions having a length direction along the seat width direction and being arrayed in the up-down direction, the width direction inflating portions being inflated and deployed intersecting the up-down inflating portions as viewed from a seat rear side.

5. The occupant protection device of claim 1, further comprising:

a seatbelt device that is configured to restrain a waist of the occupant using a lap belt, wherein the delayed inflating portion is supplied with gas from a gas supply section disposed at a lower portion of the front inflating portion in an inflated and deployed state.

6. The occupant protection device of claim 5, wherein:

the front inflating portion includes a lower inflating portion that is configured to inflate and deploy in front of at least one out of shoulders or a chest of the occupant; and the gas supply section is disposed at a lower portion of the lower inflating portion in an inflated and deployed state.

7. The occupant protection device of claim 1, wherein:

the front inflating portion includes a lower inflating portion that is configured to inflate and deploy in front of at least one out of shoulders or a chest of the occupant; and the delayed inflating portion includes an upper body restraint portion that is configured to inflate and deploy toward the shoulders and chest of the occupant from a side of the lower inflating portion present in an inflated and deployed state.

8. The occupant protection device of claim 1, wherein:

the delayed inflating portion is supplied with gas from the front inflating portion through a communicating hole formed piercing through a base cloth at a portion dividing between the front inflating portion and the delayed inflating portion.

9. The occupant protection device of claim 1, further comprising:

a pair of the frame ducts that are provided separated from each other in the seat width direction in an inflated and deployed state; and a cross inflating portion that couples together the upper ducts of the pair of frame ducts and that is inflated and deployed on receiving gas supplied from the upper duct of the frame duct.

10. The occupant protection device of claim 9, wherein:

each of the pair of frame ducts includes a front duct that is inflated and deployed downward from the seat front end of the upper duct;

the front inflating portion is, in an inflated and deployed state, connected to the respective front ducts of the pair of frame ducts; and the pair of lateral inflating portions are, in an inflated and deployed state, connected to the upper ducts and the front ducts of the frame ducts.

11. The occupant protection device of claim 1, wherein the delayed inflating portion is configured to inflate and deploy at a seat rear side of the front inflating portion.

12. The occupant protection device of claim 1, wherein the delayed inflating portion is formed by folding back from the front inflating portion.

* * * * *